US008344052B2

(12) United States Patent
Braksmayer et al.

(10) Patent No.: US 8,344,052 B2
(45) Date of Patent: Jan. 1, 2013

(54) HOT MELT ADHESIVE COMPOSITIONS COMPRISING METATHESIZED UNSATURATED POLYOL ESTER WAX

(75) Inventors: Diza Pearl Braksmayer, Chanhassen, MN (US); Risha Bond, Mountain View, CA (US); William L. Bunnelle, Ham Lake, MN (US); Thomas H. Quinn, St. Paul, MN (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 619 days.

(21) Appl. No.: 12/373,016

(22) PCT Filed: Jul. 12, 2007

(86) PCT No.: PCT/US2007/015866
§ 371 (c)(1),
(2), (4) Date: Oct. 21, 2009

(87) PCT Pub. No.: WO2008/008420
PCT Pub. Date: Jan. 17, 2008

(65) Prior Publication Data
US 2010/0047499 A1  Feb. 25, 2010

Related U.S. Application Data

(60) Provisional application No. 60/830,235, filed on Jul. 12, 2006.

(51) Int. Cl.
C08L 91/00 (2006.01)
B32B 33/00 (2006.01)
(52) U.S. Cl. ........................................ 524/313; 428/40.5
(58) Field of Classification Search .................. 524/313
See application file for complete search history.

(56) References Cited

U.S. PATENT DOCUMENTS

| | | |
|---|---|---|
| 1,935,946 A | 11/1933 | Egan et al. |
| 1,954,659 A | 4/1934 | Will |
| 2,294,229 A | 8/1942 | Fiero |
| 2,468,799 A | 5/1949 | Ziels et al. |
| 2,784,891 A | 3/1957 | Thielke |
| 3,448,178 A | 6/1969 | Flanagan |
| 3,630,697 A | 12/1971 | Duling et al. |
| 3,645,705 A | 2/1972 | Miller et al. |
| 3,744,956 A | 7/1973 | Hess |
| 3,844,706 A | 10/1974 | Tsaras |
| 4,118,203 A | 10/1978 | Beardmore et al. |
| 4,134,718 A | 1/1979 | Kayfetz et al. |
| 4,292,088 A | 9/1981 | Scheuffgen et al. |
| 4,293,345 A | 10/1981 | Zeilstra et al. |
| 4,314,915 A | 2/1982 | Wiegers et al. |
| 4,390,590 A | 6/1983 | Saunders et al. |
| 4,411,829 A | 10/1983 | Schulte-Elte et al. |
| 4,434,306 A | 2/1984 | Kobayashi et al. |
| 4,507,077 A | 3/1985 | Sapper |
| 4,545,941 A | 10/1985 | Rosenburg |
| 4,554,107 A | 11/1985 | Takao |
| 4,567,548 A | 1/1986 | Schneeberger |
| 4,608,011 A | 8/1986 | Comstock |
| 4,614,625 A | 9/1986 | Wilson |
| 4,623,488 A | 11/1986 | Takao |
| 4,714,496 A | 12/1987 | Luken, Jr. et al. |
| 4,759,709 A | 7/1988 | Luken, Jr. et al. |
| 4,813,975 A | 3/1989 | Poulina et al. |
| 4,842,648 A | 6/1989 | Phadoemchit et al. |
| 4,855,098 A | 8/1989 | Taylor |
| 4,923,708 A | 5/1990 | Given, Jr. |
| 5,142,072 A | 8/1992 | Stipp et al. |
| 5,171,329 A | 12/1992 | Lin |
| 5,258,197 A | 11/1993 | Wheeler et al. |
| 5,338,187 A | 8/1994 | Elharar |
| 5,380,544 A | 1/1995 | Klemann et al. |
| 5,578,089 A | 11/1996 | Elsamaloty |
| 5,660,865 A | 8/1997 | Pedersen et al. |
| 5,700,516 A | 12/1997 | Sandvick et al. |
| 5,723,137 A | 3/1998 | Wahle et al. |
| 5,753,015 A | 5/1998 | Sinwald et al. |
| 5,843,194 A | 12/1998 | Spaulding |
| 5,885,600 A | 3/1999 | Blum et al. |
| 5,888,487 A | 3/1999 | Baumoeller et al. |
| 6,001,286 A | 12/1999 | Sleeter |
| 6,019,804 A | 2/2000 | Requejo et al. |
| 6,022,402 A | 2/2000 | Stephenson et al. |
| 6,063,144 A | 5/2000 | Calzada et al. |

(Continued)

FOREIGN PATENT DOCUMENTS

DE  19956226  5/2001

(Continued)

OTHER PUBLICATIONS

Tian et al., JAOCS, vol. 79, No. 5, 479-488, 2002.*
Erhan et al., JAOCS, vol. 74, No. 6, 703-706, 1997.*
Refvik, M.D. et al., "The Chemistry of Metathesized Soybean Oil," JAOCS, vol. 76, No. 1, 1999, pp. 99-102.
Office Action from counterpart Chinese Application No. 200780033854.8, dated Mar. 17, 2011, 3 pages.
Erhan et al., "Drying Properties of Metathesized Soybean Oil," Journal of American Oil Chemists' Society, AOCS Press, vol. 74, No. 6, 1997, pp. 703-706.
Mol, "Applications of Olefin Metathesis in Oleochemistry: An Example of Green Chemistry," Green Chemistry, Royal Society of Chemistry, Cambridge, GB, vol. 4, 2002, pp. 5-13.

(Continued)

Primary Examiner — Hui Chin
(74) Attorney, Agent, or Firm — Brinks Hofer Gilson & Lione

(57) ABSTRACT

Disclosed are hot melt adhesive compositions comprising a metathesized unsaturated polyol ester wax. Typically, the metathesized unsaturated polyol ester wax is derived from renewable starting materials such as vegetable oils or animal fats. The metathesized unsaturated polyol ester wax typically replaces a portion or all of a petroleum-derived wax or synthetic wax in various hot melt adhesive compositions. The hot melt adhesives may be conventional hot melt adhesives or hot melt pressure-sensitive adhesives.

24 Claims, 12 Drawing Sheets

U.S. PATENT DOCUMENTS

| | | | |
|---|---|---|---|
| 6,099,877 A | 8/2000 | Schuppan |
| 6,103,308 A | 8/2000 | Floyd et al. |
| 6,106,597 A | 8/2000 | Starks et al. |
| 6,123,979 A | 9/2000 | Hepburn et al. |
| 6,127,326 A | 10/2000 | Dieckmann et al. |
| 6,132,742 A | 10/2000 | Le Bras et al. |
| 6,156,369 A | 12/2000 | Eger et al. |
| 6,197,894 B1 | 3/2001 | Sunaga et al. |
| 6,201,053 B1 | 3/2001 | Dieckmann et al. |
| 6,211,315 B1 | 4/2001 | Larock et al. |
| 6,214,918 B1 | 4/2001 | Johnson et al. |
| 6,224,641 B1 | 5/2001 | Matzat et al. |
| 6,238,926 B1 | 5/2001 | Liu et al. |
| 6,255,375 B1 | 7/2001 | Michelman |
| 6,258,965 B1 | 7/2001 | O'Lenick, Jr. |
| 6,262,153 B1 | 7/2001 | Webster et al. |
| 6,276,925 B1 | 8/2001 | Varga |
| 6,277,310 B1 | 8/2001 | Sleeter |
| 6,284,007 B1 | 9/2001 | Tao |
| 6,486,264 B1 | 11/2002 | Tsunogae et al. |
| 6,497,735 B2 | 12/2002 | Tao |
| 6,503,077 B2 | 1/2003 | Orth et al. |
| 6,503,285 B1 | 1/2003 | Murphy |
| 6,582,748 B1 | 6/2003 | Loh et al. |
| 6,586,506 B2 | 7/2003 | Webster et al. |
| 6,599,334 B1 | 7/2003 | Anderson |
| 6,645,261 B2 | 11/2003 | Murphy et al. |
| 6,673,763 B1 | 1/2004 | Hansen et al. |
| 6,696,597 B2 | 2/2004 | Pedersen et al. |
| 6,730,137 B2 | 5/2004 | Pesu et al. |
| 6,733,548 B2 | 5/2004 | Rasmussen et al. |
| 6,758,869 B2 | 7/2004 | Roeske et al. |
| 6,770,104 B2 | 8/2004 | Murphy |
| 6,773,469 B2 | 8/2004 | Murphy |
| 6,797,020 B2 | 9/2004 | Murphy |
| 6,824,572 B2 | 11/2004 | Murphy |
| 6,846,573 B2 | 1/2005 | Seydel |
| 6,852,140 B1 | 2/2005 | Roeske |
| 6,890,982 B2 * | 5/2005 | Borsinger et al. ............ 524/277 |
| 6,900,347 B2 | 5/2005 | Paulson et al. |
| 6,943,262 B2 | 9/2005 | Kodali et al. |
| 6,962,729 B2 | 11/2005 | Tokas et al. |
| 6,987,154 B2 | 1/2006 | Choi et al. |
| 7,026,495 B1 | 4/2006 | Pedersen et al. |
| 7,037,439 B2 | 5/2006 | Tavares |
| 7,119,216 B2 | 10/2006 | Newman et al. |
| 7,128,766 B2 | 10/2006 | Murphy et al. |
| 7,176,171 B2 | 2/2007 | Nieendick et al. |
| 7,176,336 B2 | 2/2007 | Maughon et al. |
| 7,192,457 B2 | 3/2007 | Murphy et al. |
| 7,217,301 B2 | 5/2007 | Murphy et al. |
| 7,314,904 B2 | 1/2008 | Nadolsky et al. |
| 7,365,140 B2 | 4/2008 | Piers et al. |
| 7,387,649 B2 | 6/2008 | Tao |
| 7,462,205 B2 | 12/2008 | Murphy |
| 7,510,584 B2 | 3/2009 | Cap |
| 7,569,084 B2 | 8/2009 | Tao et al. |
| 7,576,227 B2 | 8/2009 | Lysenko |
| 7,585,990 B2 | 9/2009 | Toor et al. |
| 7,588,607 B1 | 9/2009 | Cap |
| 7,601,184 B2 | 10/2009 | Tischendorf |
| 7,637,968 B2 | 12/2009 | Murphy |
| 7,678,932 B2 | 3/2010 | Thurier et al. |
| 7,795,336 B2 * | 9/2010 | Paul et al. ................. 524/277 |
| 7,812,185 B2 | 10/2010 | Burdett et al. |
| 7,833,294 B2 | 11/2010 | Murphy et al. |
| 2001/0013195 A1 | 8/2001 | Tao |
| 2001/0051680 A1 | 12/2001 | Webster et al. |
| 2002/0005007 A1 | 1/2002 | Roeske et al. |
| 2002/0095007 A1 | 7/2002 | Larock et al. |
| 2002/0144455 A1 | 10/2002 | Bertrand et al. |
| 2002/0157303 A1 | 10/2002 | Murphy et al. |
| 2003/0008257 A1 | 1/2003 | Tao |
| 2003/0017431 A1 | 1/2003 | Murphy |
| 2003/0022121 A1 | 1/2003 | Biggs |
| 2003/0046860 A1 | 3/2003 | Tiffany et al. |
| 2003/0057599 A1 | 3/2003 | Murphy et al. |
| 2003/0061760 A1 | 4/2003 | Tao et al. |
| 2003/0091949 A1 | 5/2003 | Pesu et al. |
| 2003/0110683 A1 | 6/2003 | Murphy |
| 2003/0134244 A1 | 7/2003 | Gray et al. |
| 2003/0198826 A1 | 10/2003 | Seydel |
| 2003/0207971 A1 | 11/2003 | Stuart, Jr. et al. |
| 2003/0213163 A1 | 11/2003 | Berger et al. |
| 2003/0236377 A1 | 12/2003 | Choi et al. |
| 2004/0000088 A1 | 1/2004 | Wesley |
| 2004/0037859 A1 | 2/2004 | Cecchi et al. |
| 2004/0047886 A1 | 3/2004 | Murphy et al. |
| 2004/0076732 A1 | 4/2004 | Valix |
| 2004/0088907 A1 | 5/2004 | Murphy |
| 2004/0088908 A1 | 5/2004 | Murphy |
| 2004/0138359 A1 | 7/2004 | Dinkelaker et al. |
| 2004/0200136 A1 | 10/2004 | Tao et al. |
| 2004/0221503 A1 | 11/2004 | Murphy et al. |
| 2004/0221504 A1 | 11/2004 | Murphy |
| 2004/0250464 A1 | 12/2004 | Rasmussen et al. |
| 2005/0014664 A1 | 1/2005 | Nadolsky et al. |
| 2005/0027136 A1 | 2/2005 | Toor et al. |
| 2005/0060927 A1 | 3/2005 | Murphy |
| 2005/0070750 A1 | 3/2005 | Newman et al. |
| 2005/0080301 A1 | 4/2005 | Maughon et al. |
| 2005/0095545 A1 | 5/2005 | Tischendorf |
| 2005/0123780 A1 | 6/2005 | Seydel |
| 2005/0154221 A1 | 7/2005 | Lysenko et al. |
| 2005/0158679 A1 | 7/2005 | Chen et al. |
| 2005/0269728 A1 | 12/2005 | Roos |
| 2006/0079704 A1 | 4/2006 | Lacombe et al. |
| 2006/0128912 A1 | 6/2006 | Piers et al. |
| 2006/0236593 A1 | 10/2006 | Cap |
| 2006/0272199 A1 | 12/2006 | Licciardello et al. |
| 2006/0272200 A1 | 12/2006 | Murphy et al. |
| 2006/0289138 A1 | 12/2006 | Borsinger et al. |
| 2007/0006521 A1 | 1/2007 | Licciardello et al. |
| 2007/0006522 A1 | 1/2007 | Tao |
| 2007/0039237 A1 | 2/2007 | Murphy et al. |
| 2007/0056211 A1 | 3/2007 | Li et al. |
| 2007/0144058 A1 | 6/2007 | Chen et al. |
| 2007/0151480 A1 | 7/2007 | Bloom et al. |
| 2007/0179307 A1 | 8/2007 | Olivier-Bourbigou et al. |
| 2007/0270621 A1 | 11/2007 | Millis et al. |
| 2007/0282000 A1 | 12/2007 | Murphy et al. |
| 2008/0027194 A1 | 1/2008 | Schrodi |
| 2008/0064891 A1 | 3/2008 | Lee |
| 2008/0138753 A1 | 6/2008 | Tao et al. |
| 2008/0145808 A1 | 6/2008 | Lee |
| 2008/0206411 A1 | 8/2008 | Nielsen |
| 2008/0307696 A1 | 12/2008 | Wu et al. |
| 2009/0048459 A1 | 2/2009 | Tupy et al. |
| 2009/0119977 A1 | 5/2009 | Murphy |
| 2009/0126602 A1 | 5/2009 | Murphy et al. |
| 2009/0217568 A1 | 9/2009 | Murphy et al. |
| 2009/0220443 A1 | 9/2009 | Braksmayer et al. |
| 2009/0259065 A1 | 10/2009 | Abraham et al. |
| 2009/0264672 A1 | 10/2009 | Abraham et al. |
| 2010/0024281 A1 | 2/2010 | Lemke et al. |
| 2010/0044924 A1 | 2/2010 | Cap |
| 2010/0094034 A1 | 4/2010 | Kaido et al. |
| 2010/0132250 A1 | 6/2010 | Uptain et al. |
| 2010/0145086 A1 | 6/2010 | Schrodi et al. |
| 2010/0205851 A1 | 8/2010 | Uptain et al. |

FOREIGN PATENT DOCUMENTS

| | | |
|---|---|---|
| EP | 0429995 A2 | 6/1991 |
| EP | 0536861 A1 | 4/1993 |
| EP | 0545715 A1 | 6/1993 |
| EP | 0685554 A1 | 12/1995 |
| EP | 0811664 A1 | 12/1997 |
| EP | 1408064 A1 | 4/2004 |
| EP | 1693436 A1 | 8/2006 |
| EP | 1696022 A1 | 8/2006 |
| EP | 1801096 A1 | 6/2007 |
| FR | 2878246 A1 | 5/2006 |
| JP | 56-32550 A | 4/1981 |
| JP | 56-077243 A | 6/1981 |
| JP | 04-59897 A | 2/1992 |
| JP | 06-009987 A | 1/1994 |
| JP | 09-014574 A | 1/1997 |

| | | |
|---|---|---|
| SU | 1565872 A1 | 7/1988 |
| WO | WO 92/00269 A1 | 1/1992 |
| WO | WO 94/23836 A1 | 10/1994 |
| WO | WO 96/00815 A1 | 1/1996 |
| WO | WO 96/04289 A1 | 2/1996 |
| WO | WO 96/14373 A1 | 5/1996 |
| WO | WO 98/45390 A1 | 10/1998 |
| WO | WO 99/27043 A1 | 6/1999 |
| WO | WO 01/36368 A2 | 5/2001 |
| WO | WO 02/30386 A1 | 4/2002 |
| WO | WO 02/092736 A1 | 11/2002 |
| WO | WO 03/012016 A1 | 2/2003 |
| WO | WO 03/051134 A2 | 6/2003 |
| WO | WO 03/057983 A1 | 7/2003 |
| WO | WO 03/093215 A1 | 11/2003 |
| WO | WO 03/104348 A1 | 12/2003 |
| WO | WO 2004/033388 A1 | 4/2004 |
| WO | WO 2004/062763 A2 | 7/2004 |
| WO | WO 2004/083310 A1 | 9/2004 |
| WO | WO 2004/101720 A1 | 11/2004 |
| WO | WO 2005/042655 A2 | 5/2005 |
| WO | WO 2005/080455 A1 | 9/2005 |
| WO | WO 2006/041011 A1 | 4/2006 |
| WO | WO 2006/052688 A2 | 5/2006 |
| WO | WO 2006/076364 A2 | 7/2006 |
| WO | WO 2007/002999 A1 | 1/2007 |
| WO | WO 2007/081987 A2 | 7/2007 |
| WO | WO 2007/103398 A1 | 9/2007 |
| WO | WO 2007/103460 A2 | 9/2007 |
| WO | WO 2008/010961 A2 | 1/2008 |
| WO | WO 2008/048520 A2 | 4/2008 |
| WO | WO 2008/063322 A2 | 5/2008 |
| WO | WO 2008/103289 A1 | 8/2008 |
| WO | WO 2008/140468 A2 | 11/2008 |
| WO | WO 2008/151064 A1 | 12/2008 |
| WO | WO 2008/157436 A1 | 12/2008 |

OTHER PUBLICATIONS

International Search Report and Written Opinion of the International Searching Authority for International Application No. PCT/US2007/015866, dated Nov. 26, 2007, 8 pages.

Anderson et al., "Synthesis and Reactivity of Olefin Metathesis Catalysts Bearing Cyclic (Alkyl)(Amino) Carbenes," Angewandte Chemie International Edition, vol. 46, 2007, pp. 7262-7265.

Baumann et al., "Natural Fats and Oils—Renewable Raw Materials for the Chemical Industry," Angewandte Chemie International Edition in English, vol. 27, 1988, pp. 41-62.

Behren et al., "Beeswax and other Non-Paraffin Waxes," Presented at NCA Technical Meeting, Jun. 19-20, 1991, 6 pages.

Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.

Biermann et al., "New Syntheses with Oils and Fats as Renewable Raw Materials for the Chemical Industry,", Angewandte Chemie International Edition, vol. 39, 2000, pp. 2206-2224.

Boelhouwer et al., "Metathesis Reactions of Fatty Acid Esters," Progress of Lipid Research, Pergamon Press, vol. 24, No. 3, 1985, pp. 243-267.

Choi et al., "Olefin Metathesis Involving Ruthenium Enoic Carbene Complexes," Journal of the American Chemical Society, vol. 123, No. 42, 2001, pp. 10417-10418.

Connon et al., "A Solid-Supported Phosphine-Free Ruthenium Alkylidene for Olefin Metathesis in Methanol and Water," Bioorganic & Medical Chem Letters, vol. 12, No. 14, 2002, pp. 1873-1876.

Dunne et al., "A Highly Efficient Olefin Metathesis Initiator: Improved Synthesis and Reactivity Studies," Tetrahedron Letters, vol. 44, No. 13, 2003, pp. 2733-2736.

Frahm, "Harvest Lights: The only soy-based candle, a bright idea," available at http://www.extension.uiuc.edu/~stratsoy/new/news/html/909166253,html, Oct. 23, 1998, 2 pages.

Lavallo, "Stable Cyclic (Alkyl)(Amino) Carbenes as Rigid or Flexible, Bulky, Electron-Rich Ligands for Transition-Metal Catalysts: A Quaternary Carbon Atom Makes the Difference," Angewandte Chemie Int. Ed., vol. 44, 2005, pp. 5705-5709.

Maynard et al., "Purification Technique for the Removal of Ruthenium from Olefin Metathesis Reaction Products," Tetrahedron Letters, vol. 40, No. 22, 1999, pp. 4137-4140.

Mol et al., "Metathesis in Oleochemistry," J Braz Chem Soc, vol. 9, No. 1, 1998, pp. 1-11.

Mol, "Catalytic Metathesis of Unsaturated Fatty Acid Esters and Oils," Topics in Catalysis, vol. 27, No. 1-4, 2004, pp. 97-104.

Noller, Chemistry of Organic Compounds, W.B. Saunders Company, $2^{nd}$ Ed., 1957, pp. 181 and 192.

Oliefabrik et al., "Paper coating", Research Disclosure Journal, Dec. 1996, 2 pages.

Orso, "New Use for Soybeans Has Bright Future," available at http://www.unitedsoybean.com/news/nr981014.htm, Oct. 14, 1998, 2 pages.

Patel et al., "High conversion and productive catalyst turnovers in cross-metathesis reactions of natural oils with 2-butene", Green Chemistry, 2006, vol. 8, pp. 450-454.

Refvik et al., "Ruthenium-Catalyzed Metathesis of Vegetable Oils," Journal of American Oil Chemists' Society, AOCS Press, vol. 76, No. 1, 1999, pp. 93-98.

Rezaei, "Hydrogenated Vegetable Oils as Candle Wax," J. of the Am. Oil Chemists' Society, vol. 12, No. 79, pp. 1241-1247 (Dec. 2002).

Schneider et al., "Synthesis of Highly Substituted Cyclopentane and Tetrahydrofuran Derivatives by Crossed Olefin Metathesis," Angewandte Chemi International Edition, vol. 35, No. 4, 1996, pp. 411-412.

Tao, "Development of Vegetable Lipid-based Candles," available at http://abe.www.ecn.purdue.edu/ABE/Research/research94/REPORT.94.Book_68.htmls, 1994, 2 pages.

Tian et al., "Model Studies and the ADMET Polymerization of Soybean Oil," Journal of American Oil Chemists' Society, AOCS Press, vol. 79, No. 5, 2002, pp. 479-488.

In Business, "America's Shining Example of Sustainable Business," available at http://www.candleworks.org, Mar./Apr. 1998, 3 pages.

Pages from Bitter Creek Candle Supply, Inc., website (http://www.execpc.com/~bcsupply) now at http://www.candlesupply.com, available at least by Jun. 29, 2000, 9 pages.

Pages from Ecowax, Nature's Gift, Inc., website (http://nglwax.com/ecowax.htm), available at least by Jul. 5, 2000, 3 pages.

Pages from Heartland Candleworks website, available at www.candleworks.org, available at least by Feb. 11, 2000, 4 pages.

Purdue Agriculture News, Purdue May Agriculture & Natural Resources Package, available at http://purduenews.uns.purdue.edu/UNS/paks/agpak.digest.9605.html, May 1996, 3 pages.

Purdue News, "Purdue students put the 'happy' back into birthday candles," available at http://www.purdue.edu/UNS/html4ever/9611.Schweitzercandles.html, Nov. 1996, 3 pages.

Purdue News, "Purdue students put the 'happy' back into birthday candles," available at http://www.purdue.edu/UNS/html4ever/9604.Schweitzercandles.html, May 1996, 2 pages.

Purdue University School of Agriculture, 1998 Farm Progress Show, available at http://www.admin.ces.purdue.edu/anr/98fps/fpspix/930.html, 1998, 4 pages.

Chatterjee et al., "Synthesis of Trisubstituted Alkenes via Olefin Cross-Metathesis," Organic Letters, vol. 1, No. 11, 1999, pp. 1751-1753.

Delaude et al., Metathesis, Kirk-Othmer Encyclopedia of Chemical Technology, Dec. 2005, vol. 26, pp. 920-958.

Ngo et al., Methathesis of Unsaturated Fatty Acids: Synthesis of Long-Chain Unsaturated-[alpha],[omega]-Dicarboxylic Acids, Journal of the American Oil Chemists, Jul. 2006, vol. 83m Iss, 7, p. 629, 9 pgs.

* cited by examiner

Internal Olefins 12　　　　　　　　14　　　　　　　　16

60

62

64

66

68

C823

C827

C627

C712

C697

C682

50 where

L = PCy$_3$, sIMes, Mes, Phobane
X = H, NO$_2$, SO$_2$N(CH$_3$)$_2$
X$_2$ = H, N$^+$(C$_2$H$_3$)$_2$CH$_3$
X$_3$ = H, Phenyl
R = H, alkyl, aryl, CO$_2$Me sIMes Mes

52 where

L = PCy$_3$, sIMes, Mes, Phobane
L' = PCy$_3$, Phobane

Phobane

US 8,344,052 B2

HOT MELT ADHESIVE COMPOSITIONS COMPRISING METATHESIZED UNSATURATED POLYOL ESTER WAX

CROSS-REFERENCE TO RELATED APPLICATIONS

This application claims the benefit of U.S. Provisional Application having Ser. No. 60/830,235, filed Jul. 12, 2006, and entitled "HOT MELT ADHESIVE COMPOSITIONS COMPRISING METATHESIZED UNSATURATED POLYOL ESTER WAX", the disclosure of which is incorporated herein by reference.

BACKGROUND

Hot melt adhesives are useful for bonding articles such as cardboard boxes, bottle labels, and the like. Hot melt adhesive compositions are thermoplastic materials that can be heated to a molten state and applied to one or more substrates for bonding. Conventional hot melt adhesives form a bond as the molten adhesive cools and solidifies while in contact with the substrates to be bonded. Pressure-sensitive hot melt adhesives are applied at elevated temperature, yet remain tacky after cooling and can be bonded to a substrate at room temperature using light pressure.

Hot melt adhesives typically comprise a polymer resin, a tackifier, and a wax. The polymer resin provides the adhesive formulation with its strength and adhesive characteristics. Tackifying agents are added to give the adhesive tack and to adjust its viscosity. Wax is added to reduce the overall viscosity of the adhesive so that is liquefies upon heating. The wax also helps to control the open time and set speed of the adhesive.

Waxes that are commonly used in hot melt adhesives include petroleum-derived waxes such as synthetic polyethylene waxes, Fischer-Tropsch waxes, microcrystalline wax, and paraffin waxes. Given that the world's supply of petroleum is finite, it is desirable to provide hot melt adhesive compositions comprising waxes that can be made from renewable starting materials. For example, the replacement of paraffin wax, microcrystalline wax, polyethylene wax, and Fisher-Tropsch wax in hot melt adhesives with waxes based on renewable starting materials is desired.

BRIEF DESCRIPTION OF THE FIGURES

The invention will be described further in connection with the attached drawing, wherein like reference numbers have been used to indicate like parts and wherein.

SUMMARY

Figure 1:
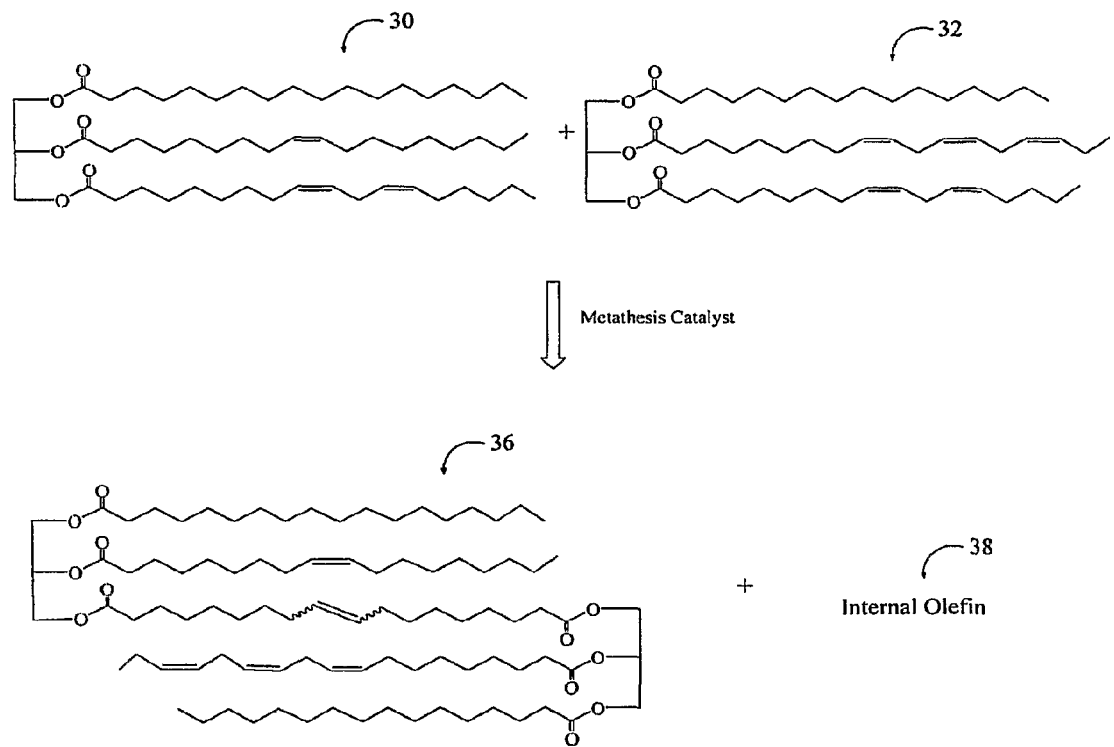
FIG. 1 is an exemplary metathesis reaction scheme.

The present invention relates to hot melt adhesive compositions comprising a metathesized unsaturated polyol ester wax. In many embodiments, the metathesized unsaturated polyol ester wax is derived from renewable starting materials such as vegetable oils or animal fats. In many embodiments, the metathesized unsaturated polyol ester wax replaces a portion or all of a petroleum-derived wax or synthetic wax in various hot melt adhesive compositions.

Embodiments of the invention may be conventional hot melt adhesives or hot melt pressure-sensitive adhesives (i.e., hot melt PSAs). Conventional hot melt adhesives are thermoplastic compositions that can be (1) heated to a molten state, (2) applied to a one or more substrates to be bonded, and (3) cooled to form an adhesive bond between the substrates. Pressure-sensitive hot melt adhesives are compositions that can be (1) heated to a molten state, (2) applied to a substrate, and (3) cooled to room temperature to form a pressure sensitive adhesive. Due to their pressure sensitive nature, pressure sensitive hot melt adhesives may be bonded at (or near) room temperature using light pressure, for example, light finger pressure. Accordingly, as used herein, the term "pressure-sensitive" is used to designate adhesive materials that will stick to a surface when pressed with light pressure, for example, light finger pressure.

Conventional and pressure-sensitive hot melt adhesives of the invention typically comprise a polymer resin, a tackifier, and a metathesized unsaturated polyol ester wax. In many embodiments, the metathesized unsaturated polyol ester wax is hydrogenated. In many embodiments, the adhesives further include a second wax material such as a synthetic or petroleum-derived wax such as paraffin wax, microcrystalline wax, polyethylene wax, Fischer-Tropsch wax, or a mixture thereof. In many embodiments, the polymer resin comprises an ethylene vinyl acetate polymer or a styrene-isoprene block copolymer.

Also described herein are adhesive-coated articles comprising a substrate having a surface that is at least partially coated with a hot melt pressure-sensitive adhesive comprising a metathesized unsaturated polyol ester wax. In many embodiments, the article comprises: (a) a substrate at least partially coated with a layer of a pressure-sensitive adhesive comprising a hydrogenated metathesized unsaturated polyol ester; and (b) a release liner comprising uncoated polyester film, wherein an uncoated surface of the release liner is in direct contact with the layer of pressure-sensitive adhesive.

DETAILED DESCRIPTION

Conventional and pressure-sensitive hot melt adhesives of the invention comprise a polymer resin, a tackifier, and a metathesized unsaturated polyol ester wax. In many embodiments, the adhesives further include a second wax material such as a synthetic or petroleum-derived wax such as paraffin wax, microcrystalline wax, polyethylene wax, Fischer-Tropsch wax, or a mixture thereof. The components of the adhesive compositions are described in more detail below.

Metathesized Unsaturated Polyol Ester Wax

A metathesized unsaturated polyol ester refers to the product obtained when one or more unsaturated polyol ester ingredient(s) are subjected to a metathesis reaction. Metathesis is a catalytic reaction that involves the interchange of alkylidene units among compounds containing one or more double bonds (i.e., olefinic compounds) via the formation and cleavage of the carbon-carbon double bonds. Metathesis may occur between two of the same molecules (often referred to as self-metathesis) and/or it may occur between two different molecules (often referred to as cross-metathesis). Self-metathesis may be represented schematically as shown in Equation I.

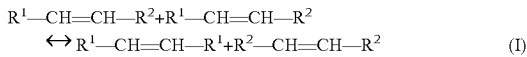

where $R^1$ and $R^2$ are organic groups.
Cross-metathesis may be represented schematically as shown in Equation II.

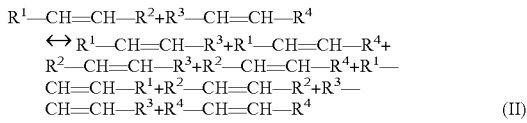

where $R^1$, $R^2$, $R^3$, and $R^4$ are organic groups.

When the unsaturated polyol ester comprises molecules that have more than one carbon-carbon double bond (i.e., a polyunsaturated polyol ester), self-metathesis results in oligomerization of the unsaturated polyol ester. The self-metathesis reaction results in the formation of metathesis dimers, metathesis trimers, and metathesis tetramers. Higher order metathesis oligomers, such as metathesis pentamers and metathesis hexamers, may also be formed by continued self-metathesis.

As a starting material, metathesized unsaturated polyol esters are prepared from one or more unsaturated polyol esters. As used herein, the term "unsaturated polyol ester" refers to a compound having two or more hydroxyl groups wherein at least one of the hydroxyl groups is in the form of an ester and wherein the ester has an organic group including at least one carbon-carbon double bond. In many embodiments, the unsaturated polyol ester can be represented by the general structure (I):

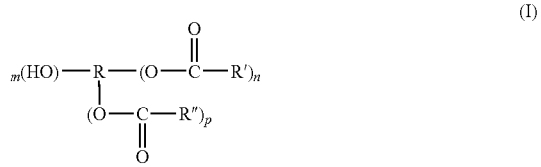

where n≧1;
m≧0;
p≧0;
(n+m+p)≧2;
R is an organic group;
R' is an organic group having at least one carbon-carbon double bond; and
R" is a saturated organic group.

In many embodiments of the invention, the unsaturated polyol ester is an unsaturated polyol ester of glycerol. Unsaturated polyol esters of glycerol have the general structure (II):

where —X, —Y, and —Z are independently selected from the group consisting of:

—OH; —(O—C(=O)—R'); and —(O—C(=O)—R");

where —R' is an organic group having at least one carbon-carbon
double bond and —R" is a saturated organic group.

In structure (II), at least one of —X, —Y, or —Z is —(O—C(=O)—R').

In some embodiments, R' is a straight or branched chain hydrocarbon having about 50 or less carbon atoms (e.g., about 36 or less carbon atoms or about 26 or less carbon atoms) and at least one carbon-carbon double bond in its chain. In some embodiments, R' is a straight or branched chain hydrocarbon having about 6 carbon atoms or greater (e.g., about 10 carbon atoms or greater or about 12 carbon atoms or greater) and at least one carbon-carbon double bond in its chain. In some embodiments, R' may have two or more carbon-carbon double bonds in its chain. In other embodiments, R' may have three or more double bonds in its chain. In exemplary embodiments, R' has 17 carbon atoms and 1 to 3 carbon-carbon double bonds in its chain. Representative examples of R' include:

—(CH$_2$)$_7$CH=CH—(CH$_2$)$_7$—CH$_3$;

—(CH$_2$)$_7$CH=CH—CH$_2$—CH=CH—(CH$_2$)$_4$—CH$_3$; and

—(CH$_2$)$_7$CH=CH—CH$_2$—CH=CH—CH$_2$—CH=CH—CH$_2$—CH$_3$.

In some embodiments, R" is a saturated straight or branched chain hydrocarbon having about 50 or less carbon atoms (e.g., about 36 or less carbon atoms or about 26 or less carbon atoms). In some embodiments, R' is a saturated straight or branched chain hydrocarbon having about 6 carbon atoms or greater (e.g., about 10 carbon atoms or greater or about 12 carbon atoms or greater. In exemplary embodiments, R" has 15 carbon atoms or 17 carbon atoms.

Sources of unsaturated polyol esters of glycerol include synthesized oils, natural oils (e.g., vegetable oils, algae oils, and animal fats), combinations of these, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, castor oil, combinations of these, and the like. Representative examples of animal fats include lard, tallow, chicken fat, yellow grease, fish oil, combinations of these, and the like. A representative example of a synthesized oil includes tall oil, which is a byproduct of wood pulp manufacture.

In an exemplary embodiment, the vegetable oil is soybean oil, for example, refined, bleached, and deodorized soybean oil (i.e., RBD soybean oil). Soybean oil is an unsaturated polyol ester of glycerol that typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid). Soybean oil is a highly unsaturated vegetable oil with many of the triglyceride molecules having at least two unsaturated fatty acids (i.e., a polyunsaturated triglyceride).

In exemplary embodiments, an unsaturated polyol ester is self-metathesized in the presence of a metathesis catalyst to form a metathesized composition. In many embodiments, the metathesized composition comprises one or more of: metathesis monomers, metathesis dimers, metathesis trimers, metathesis tetramers, metathesis pentamers, and higher order metathesis oligomers (e.g., metathesis hexamers). A metathesis dimer refers to a compound formed when two unsaturated polyol ester molecules are covalently bonded to one another by a self-metathesis reaction. In many embodiments, the molecular weight of the metathesis dimer is greater than the molecular weight of the individual unsaturated polyol ester molecules from which the dimer is formed. A metathesis trimer refers to a compound formed when three unsaturated polyol ester molecules are covalently bonded together by metathesis reactions. In many embodiments, a metathesis trimer is formed by the cross-metathesis of a metathesis dimer with an unsaturated polyol ester. A metathesis tetramer refers to a compound formed when four unsaturated polyol ester molecules are covalently bonded together by metathesis reactions. In many embodiments, a metathesis tetramer is formed by the cross-metathesis of a metathesis trimer with an unsaturated polyol ester. Metathesis tetramers may also be formed, for example, by the cross-metathesis of two metathesis dimers. Higher order metathesis products may also be formed. For example, metathesis pentamers and metathesis hexamers may also be formed.

Figure 1A:
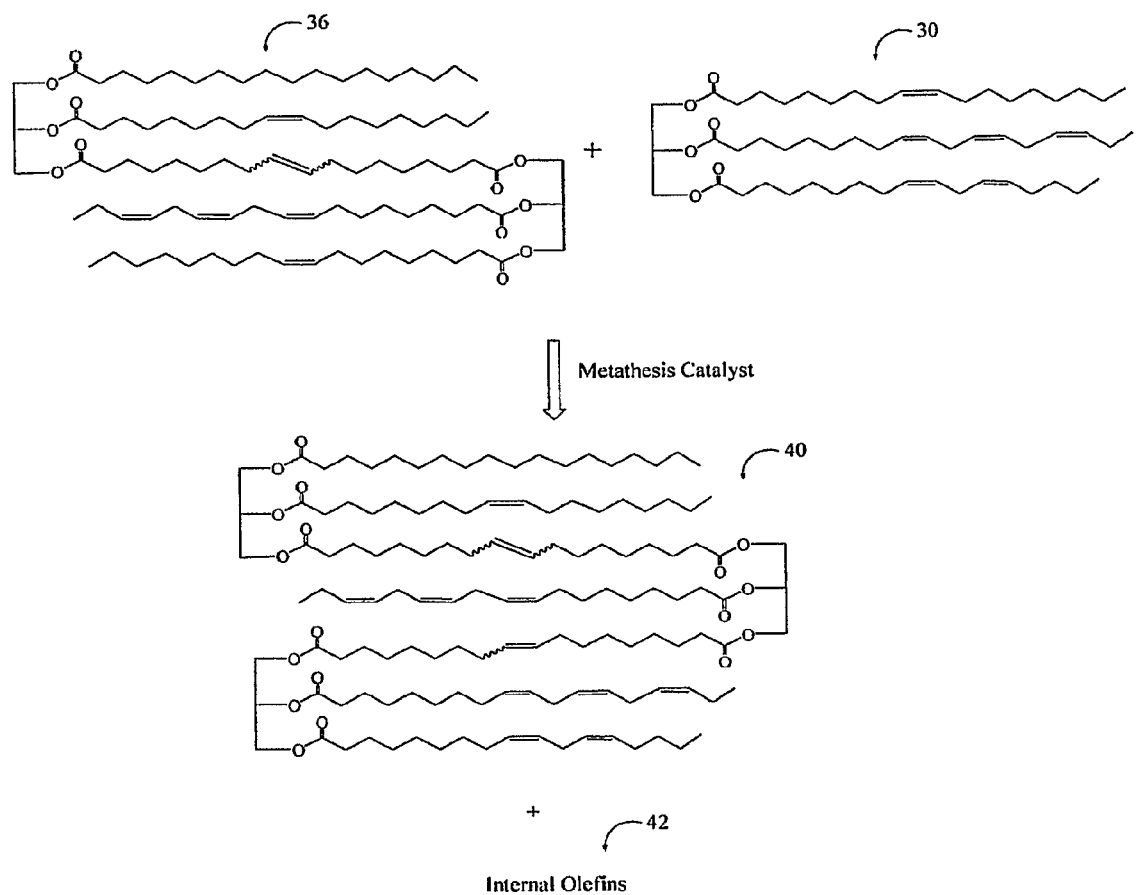
FIG. 1A is an exemplary metathesis reaction scheme.
Figure 1B:
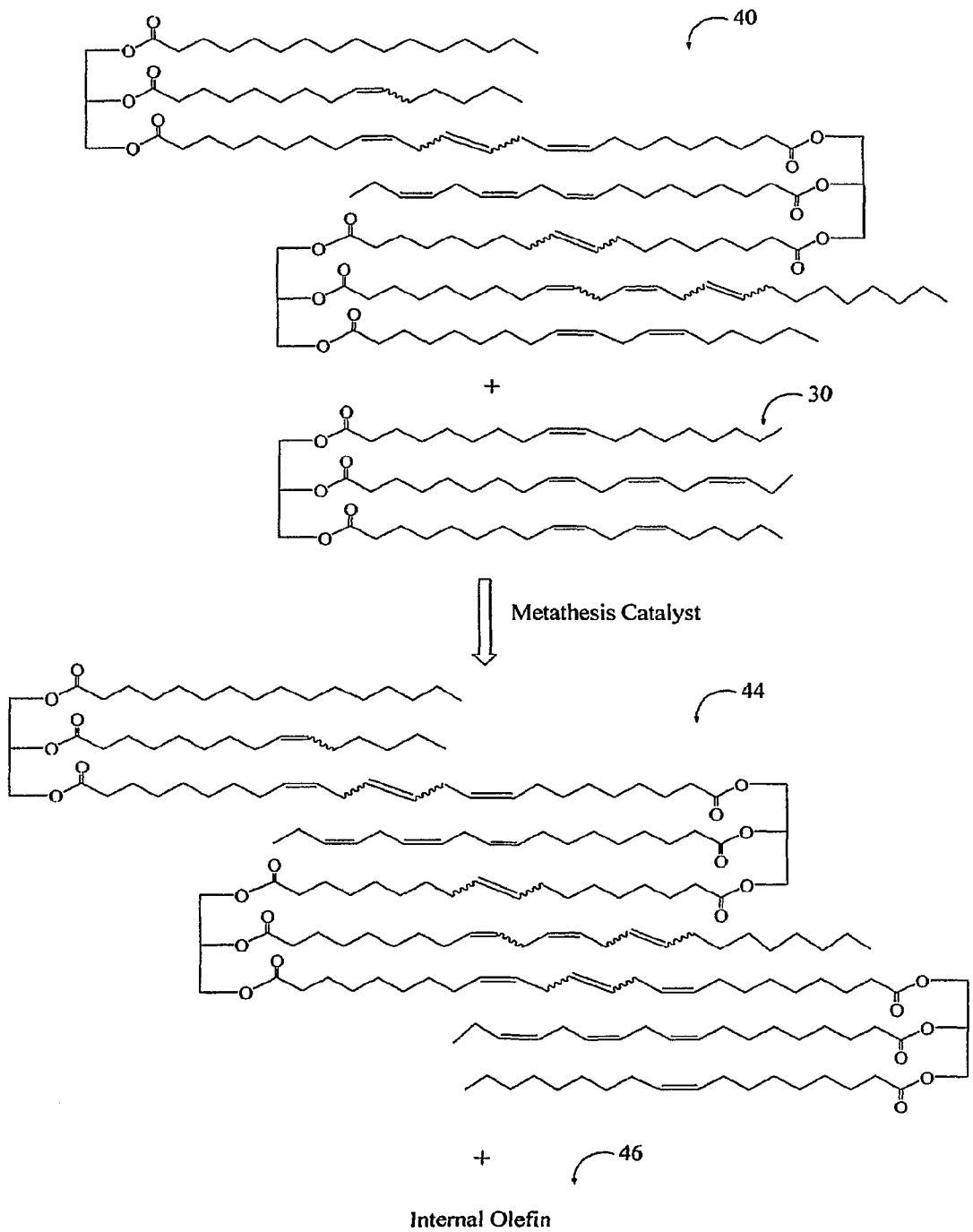
FIG. 1B is an exemplary metathesis reaction scheme.
Figure 1C:
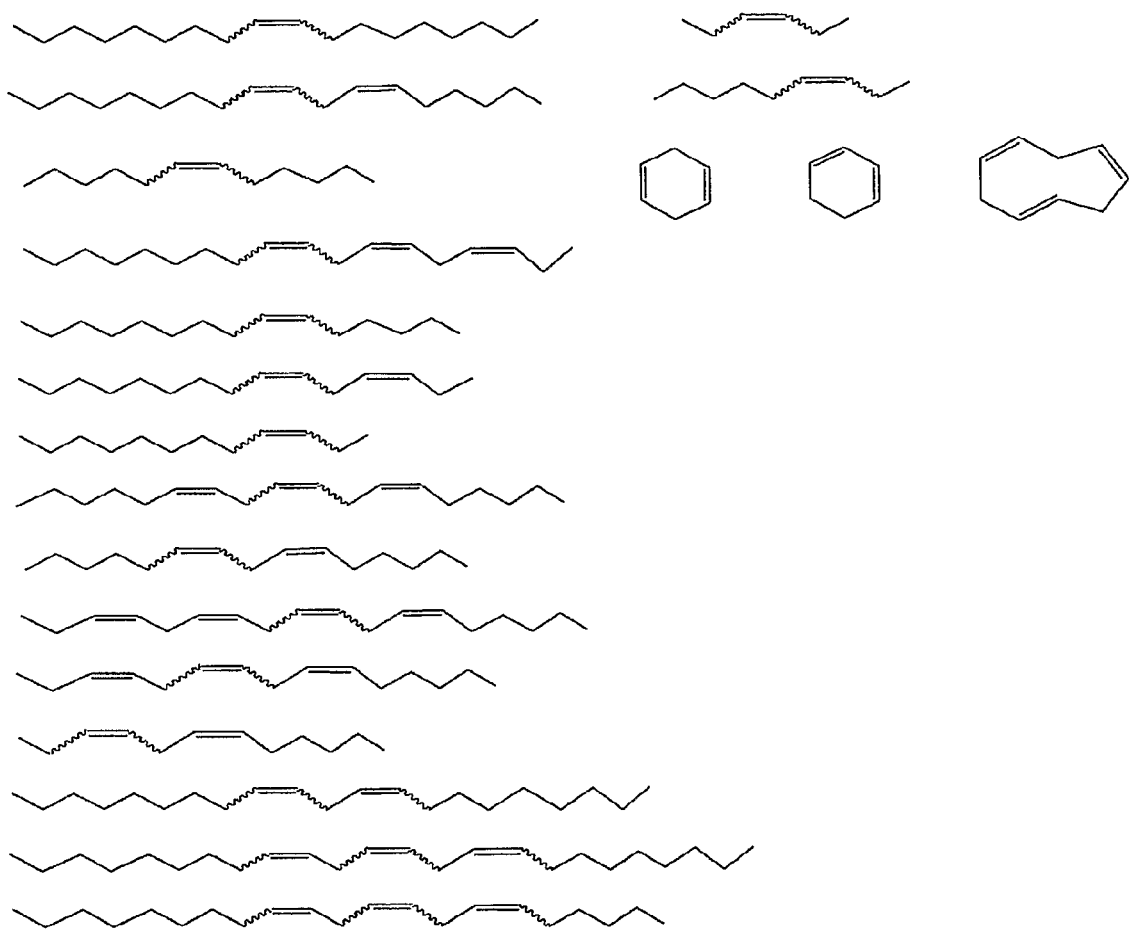
FIG. 1C displays certain internal and cyclic olefins that may be by products of the metathesis reactions of FIGS. 1-1B.

An exemplary metathesis reaction scheme is shown in FIGS. 1-1B. As shown in FIG. 1, triglyceride 30 and triglyceride 32 are self metathesized in the presence of a metathesis catalyst 34 to form metathesis dimer 36 and internal olefin 38. As shown in FIG. 1A, metathesis dimer 36 may further react with another triglyceride molecule 30 to form metathesis trimer 40 and internal olefin 42. As shown in FIG. 1B, metathesis trimer 40 may further react with another triglyceride molecule 30 to form metathesis tetramer 44 and internal olefin 46. In this way, the self-metathesis results in the formation of a distribution of metathesis monomers, metathesis dimers, metathesis trimers, metathesis tetramers, and higher order metathesis oligomers. Also typically present are metathesis monomers, which may comprise unreacted triglyceride, or triglyceride that has reacted in the metathesis reaction but has not formed an oligomer. The self-metathesis reaction also results in the formation of internal olefin compounds that may be linear or cyclic. FIG. 1C shows representative examples of certain linear and cyclic internal olefins 38, 42, 46 that may be formed during a self-metathesis reaction. If the metathesized polyol ester is hydrogenated, the linear and cyclic olefins would typically be converted to the corresponding saturated linear and cyclic hydrocarbons. The linear/cyclic olefins and saturated linear/cyclic hydrocarbons may remain in the metathesized polyol ester or they may be removed or partially removed from the metathesized polyol ester using known stripping techniques. It should be understood that FIG. 1 provides merely exemplary embodiments of metathesis reaction schemes and compositions that may result therefrom.

The relative amounts of monomers, dimers, trimers, tetramers, pentamers, and higher order oligomers may be determined by chemical analysis of the metathesized polyol ester including, for example, by liquid chromatography, specifically gel permeation chromatography (GPC). For example, the relative amount of monomers, dimers, trimers, tetramers and higher unit oligomers may be characterized, for example, in terms of "area %" or wt. %. That is, an area percentage of a GPC chromatograph can be correlated to weight percentage. In some embodiments, the metathesized unsaturated polyol ester comprises at least about 30 area % or wt. % tetramers and/or other higher unit oligomers or at least about 40 area % or wt. % tetramers and/or other higher unit oligomers. In some embodiments, the metathesized unsaturated polyol ester comprises no more than about 60 area % or wt. % tetramers and/or other higher unit oligomers or no more than about 50 area % or wt. % tetramers and/or other higher unit oligomers. In other embodiments, the metathesized unsaturated polyol ester comprises no more than about 1 area % or wt. % tetramers and/or other higher unit oligomers. In some embodiments, the metathesized unsaturated polyol ester comprises at least about 5 area % or wt. % dimers or at least about 15 area % or wt. % dimers. In some embodiments, the metathesized unsaturated polyol ester comprises no more than about 25 area % or wt. % dimers. In some of these embodiments, the metathesized unsaturated polyol ester comprises no more than about 20 area % or wt. % dimers or no more than about 10 area % or wt. % dimers. In some embodiments, the metathesized unsaturated polyol ester comprises at least 1 area % or wt. % trimers. In some of these embodiments, the metathesized unsaturated polyol ester comprises at least about 10 area % or wt. % trimers. In some embodiments, the metathesized unsaturated polyol ester comprises no more than about 20 area % or wt. % trimers or no more than about 10 area % or wt. % trimers. According to some of these embodiments, the metathesized unsaturated polyol ester comprises no more than 1 area % or wt. % trimers.

In some embodiments, the unsaturated polyol ester is partially hydrogenated before being metathesized. For example, in some embodiments, the soybean oil is partially hydrogenated to achieve an iodine value (IV) of about 120 or less before subjecting the partially hydrogenated soybean oil to metathesis.

In some embodiments, the hydrogenated metathesized polyol ester has an iodine value (IV) of about 100 or less, for example, about 90 or less, about 80 or less, about 70 or less, about 60 or less, about 50 or less, about 40 or less, about 30 or less, about 20 or less, about 10 or less or about 5 or less.

Figure 2:
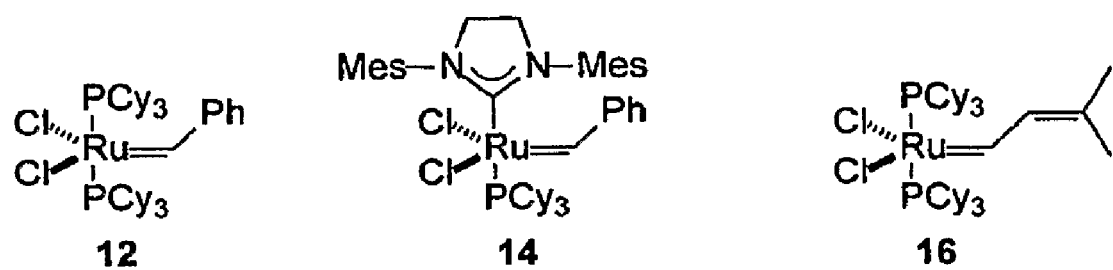
FIG. 2 is a figure showing exemplary ruthenium-based metathesis catalysts.
Figure 3:
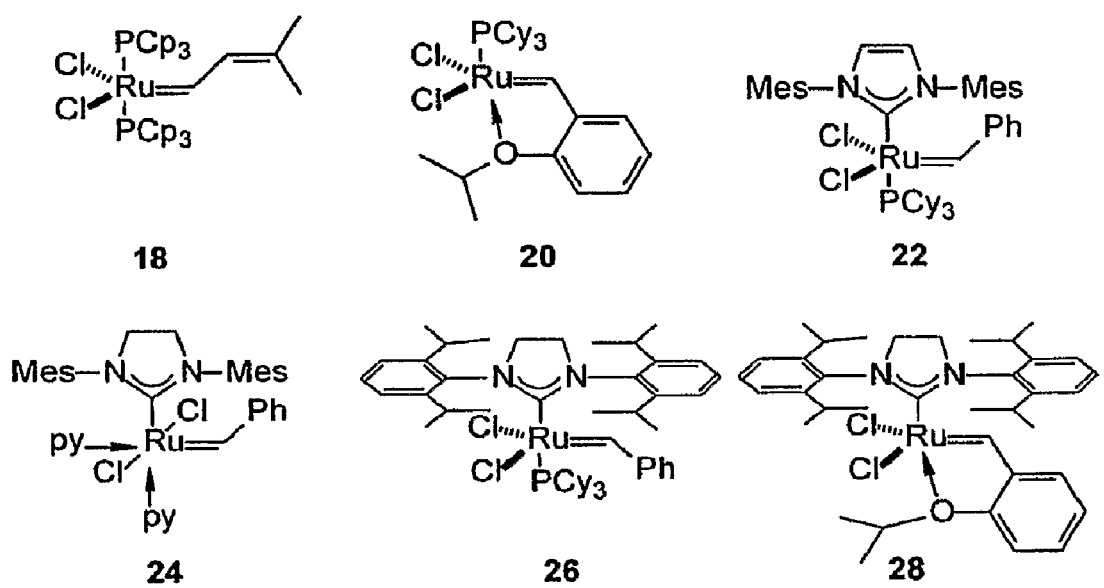
FIG. 3 is a figure showing exemplary ruthenium-based metathesis catalysts.
Figure 4:
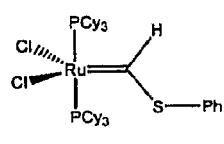
FIG. 4 is a figure showing exemplary ruthenium-based metathesis catalysts.
Figure 4:
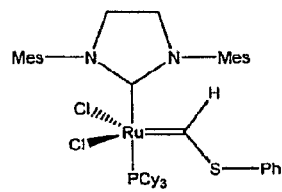
Figure 4:
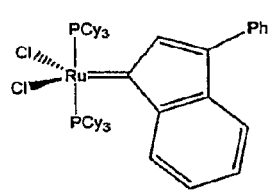
Figure 4:
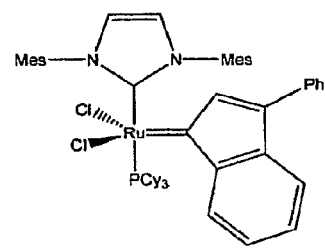
Figure 4:
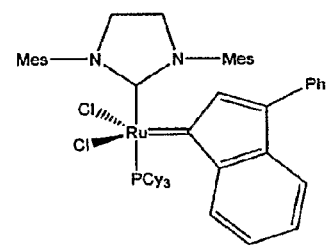
Figure 5:
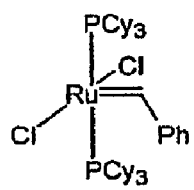
FIG. 5 is a figure showing exemplary ruthenium-based metathesis catalysts.
Figure 5:
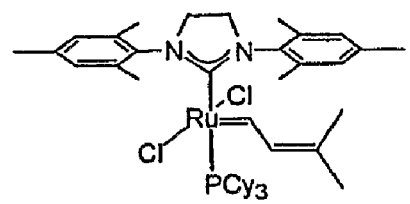
Figure 5:
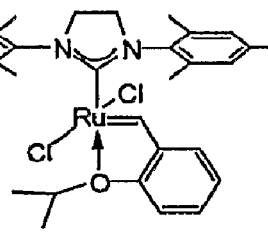
Figure 5:
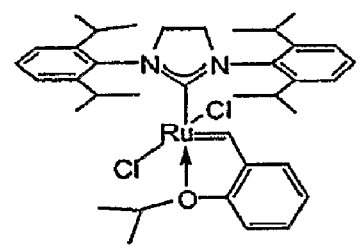
Figure 5:
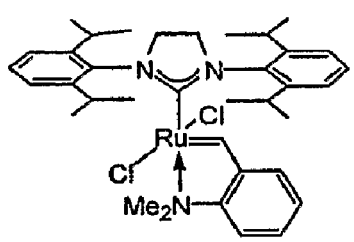
Figure 5:
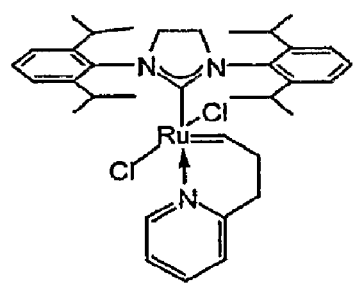
Figure 6:
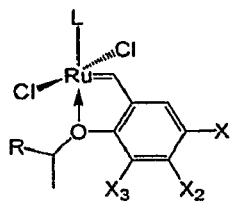
FIG. 6 is a figure showing exemplary ruthenium-based metathesis catalysts.
Figure 6:
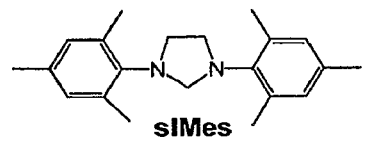
Figure 6:
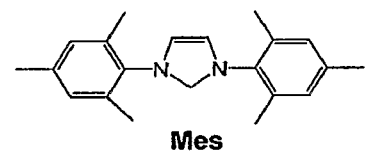
Figure 6:
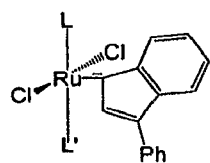
Figure 6:
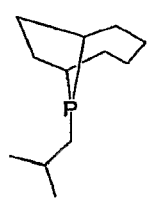

Method of Making Metathesized Unsaturated Polyol Ester:

The self-metathesis of unsaturated polyol esters is typically conducted in the presence of a catalytically effective amount of a metathesis catalyst. The term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. Referring to FIG. 2, exemplary ruthenium-based metathesis catalysts include those represented by structures 12 (commonly known as Grubbs's catalyst), 14 and 16. Referring to FIG. 3, structures 18, 20, 22, 24, 26, and 28 represent additional ruthenium-based metathesis catalysts. Referring to FIG. 4, structures 60, 62, 64, 66, and 68 represent additional ruthenium-based metathesis catalysts. Referring to FIG. 5, catalysts C627, C682, C697, C712, and C827 represent still additional ruthenium-based catalysts. Referring to FIG. 6, general structures 50 and 52 represent additional ruthenium-based metathesis catalysts of the type reported in *Chemical & Engineering News*; Feb. 12, 2007, at pages 37-47. In the structures of FIGS. 2-6, Ph is phenyl, Mes is mesityl, py is pyridine, Cp is cyclopentyl, and Cy is cyclohexyl. Techniques for using the metathesis catalysts are known in the art (see, for example, U.S. Pat. Nos. 7,102,047; 6,794,534; 6,696,597; 6,414,097; 6,306,988; 5,922,863; 5,750,815; and metathesis catalysts with ligands in U.S. Publication No. 2007/0004917 A1). Metathesis catalysts as shown, for example, in FIGS. 2-5 are manufactured by Materia, Inc. (Pasadena, Calif.).

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne- or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted under an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives may also be present during metathesis that increase catalyst lifetime.

Any useful amount of the selected metathesis catalyst can be used in the process. For example, the molar ratio of the unsaturated polyol ester to catalyst may range from about 5:1 to about 10,000,000:1 or from about 50:1 to 500,000:1. In some embodiments, an amount of about 1 to about 10 ppm, or about 2 ppm to about 5 ppm, of the metathesis catalyst per double bond of the starting composition (i.e., on a mole/mole basis) is used.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 10 kPa, in some embodiments greater than about 30 kP, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

Hydrogenation:

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a metathesized unsaturated polyol ester, and the metathesized unsaturated polyol ester is then hydrogenated (e.g., partially or fully hydrogenated) to form a hydrogenated metathesized unsaturated polyol ester.

Hydrogenation may be conducted according to any known method for hydrogenating double bond-containing compounds such as vegetable oils. In some embodiments, the unsaturated polyol ester or metathesized unsaturated polyol ester is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

In some embodiments, the hydrogenation catalyst comprising, for example, nickel, copper, palladium, platinum, molybdenum, iron, ruthenium, osmium, rhodium, or iridium. Combinations of metals may also be used. Usefull catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. In some embodiments, the support comprises porous silica (e.g., kieselguhr, infasorial, diatomaceous, or siliceous earth)

or alumina. The catalysts are characterized by a high nickel surface area per gram of nickel.

In some embodiments, the particles of supported nickel catalyst are dispersed in a protective medium comprising hardened triacylglyceride, edible oil, or tallow. In an exemplary embodiment, the supported nickel catalyst is dispersed in the protective medium at a level of about 22 wt. % nickel.

In some embodiments, the supported nickel catalysts are of the type reported in U.S. Pat. No. 3,351,566 (Taylor et al.). These catalysts comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 wt. % to 50 wt. % nickel and a total silica content of 30 wt. % to 90 wt %. The particles are activated by calcining in air at 600° F. to 900° F., then reducing with hydrogen.

Useful catalysts having a high nickel content are described in EP 0 168 091, wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66% by weight.

Useful high activity nickel/alumina/silica catalysts are described in EP 0 167 201. The reduced catalysts have a high nickel surface area per gram of total nickel in the catalyst.

Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties. U.S. Pat. No. 4,490,480 reports high surface area nickel/alumina hydrogenation catalysts having a total nickel content of 5% to 40% wt.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

The amount of hydrogenation catalysts is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 wt. % or less, for example, about 5 wt. % or less or about 1 wt. % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 wt. % or less, for example, about 5 wt. % or less or about 1 wt. % or less. Other filtering techniques and filtering aids may also be employed to remove the used hydrogenation catalyst. In other embodiments the hydrogenation catalyst is removed using centrifugation followed by decantation of the product.

The iodine value (IV), also referred to as the iodine number, provides a measure of the degree of unsaturation of a compound. The IV measures the amount of iodine absorbed in a given time by a compound or mixture. When used in reference to an unsaturated material, such as an unsaturated polyol ester, the IV is thus a measure of the unsaturation, or the number of double bonds, of that compound or mixture. Obtaining the IV for a compound or mixture is a well-known procedure. Representative unsaturated polyol esters are known to have an IV in the range indicated in parentheses as follows: soybean oil (125-138); canola oil (110-115); sunflower oil (122-139); corn oil (99-121); palm oil (45-56); and palm kernel oil (14-24).

In some embodiments, the unsaturated polyol ester is partially hydrogenated before being metathesized such that the number of double bonds that are available in the subsequent metathesis reaction is reduced. For example, in some embodiments, soybean oil is partially hydrogenated to achieve an iodine value (IV) of about 120 or less before subjecting the partially hydrogenated soybean oil to metathesis.

In some embodiments, the unsaturated polyol ester is metathesized to form a metathesized unsaturated polyol ester, and the resulting metathesized unsaturated polyol ester is then partially or fully hydrogenated. For example, in representative embodiments metathesized soybean oil is partially hydrogenated to achieve an iodine value (IV) of about 120 or less, about 100 or less, about 90 or less, about 80 or less, about 70 or less, about 60 or less, about 50 or less, about 40 or less, about 30 or less, about 20 or less, about 10 or less, or even about 5 or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkle Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 wt. % or less, for example, about 5 wt. % or less or about 1 wt. % or less. Other filtering techniques and filtering aids may also be employed to remove the used hydrogenation catalyst. In other embodiments the hydrogenation catalyst is removed using centrifugation followed by decantation of the product.

Hydrogenation of a metathesized unsaturated polyol ester can impart one or more desirable properties to the metathesized unsaturated polyol ester. For example, hydrogenation can be used to increase the melting point of a metathesized unsaturated polyol ester. In one embodiment, a hydrogenated metathesized unsaturated polyol has a melting point in the range of from about 120° F. to about 180° F. In another embodiment, a hydrogenated metathesized unsaturated polyol has a melting point in the range of from about 120° F. to about 160° F. In another embodiment, a hydrogenated metathesized unsaturated polyol has a melting point of 128° F. or greater. In still another embodiment, a hydrogenated metathesized unsaturated polyol has a melting point of 145° F. or greater.

The hydrogenated metathesized polyol ester wax may be included in the hot melt adhesive in any useful amount. Many factors can influence the amount of hydrogenated metathesized polyol ester wax that is used in an adhesive composition of the invention, such as the melting point of the hydrogenated metathesized polyol ester wax, the viscosity of the hydrogenated metathesized polyol ester, the desired adhesive open time, the desired adhesive set time, the desired bond strength and adhesive, and the methodology used to apply the adhesive composition to a substrate.

Typically, the hydrogenated metathesized polyol ester wax will be present in an amount of about 50% weight or less, for example, about 45% by weight or less, about 40% by weight or less, about 35% weight or less, about 30% weight or less, about 25% weight or less, about 20% weight or less, or about 10% weight or less of the adhesive composition. In many embodiments, the hydrogenated metathesized polyol ester wax is present in an amount ranging from about 1% to about 30%, more typically from about 5% to about 25% by weight of the adhesive composition.

Polymer Resin

Hot melt adhesives of the invention typically comprise a polymer resin. The polymer resin may be of any polymer type known to be useful in hot melt adhesive compositions. Various polymer types may be selected in order to provide adhesive properties including, for example, adhesive strength, flexibility, heat resistance, shear strength, and impact resistance. In many embodiments, the hot melt adhesives of the invention comprise at least one ethylene polymer, and may comprise a blend of two or more polymer resins. The term ethylene polymer refers to homopolymers, copolymers and terpolymers of ethylene. Preferred are copolymers of ethylene with one or more polar monomers, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate, ethylene 2-ethylhexylacrylate, ethylene octene and mixtures and blends thereof. Mixtures of ethylene n-butyl acrylate and ethylene vinyl acetate are particularly preferred.

Other polymers that may be useful include homopolymers or copolymers of propylene, octene, hexene, heptene, butene, and ethylene monomers. Preferably these polymers are synthesized by single site catalysis. Metallocene is one example of a single site catalyst suitable for synthesis of polymers utilized in this invention. Dow Chemical sells commercial metallocene catalyzed polymers under the trade name Insight.

Useful ethylene vinyl acetate polymers typically have a vinyl acetate content from about 10% to about 45% by weight. Ethylene vinyl acetate copolymers are available from Exxon/Mobil under the trade designation "ESCORENE 7510" (a 18.7% VA copolymer from Exxon/Mobil). Other examples include ethylene vinylacetate copolymers available under the trade designation "ULTRATHENE" (18% VA copolymer from Equistar Chemicals, Houston Tex.) and ULTRATHENE UE 646-04 (28% VA copolymer). Also useful are those available from DuPont Chemical Co., Wilmington, Del. under the trade designation "ELVAX" (e.g., Elvax™ 205 W, which has a melt index of 800 and vinyl acetate content of about 28% by weight in the copolymer.

In many embodiments, the hot melt adhesives of the invention are pressure-sensitive adhesives. Suitable polymer resins for pressure-sensitive adhesives include, for example, styrene-isoprene block copolymers. One useful styrene-isoprene block copolymer is commercially available under the trade designation "VECTOR 4230" from Dexco Polymers LP. The styrene-isoprene radial copolymer has a styrene content of about 20.5% weight and a diblock content of about 30% weight. Also useful in hot melt adhesives are SIBS block copolymers (i.e., styrene-isoprene-butadiene-styrene block copolymers (e.g., commercially available under the trade designation "KRATON"), SBS block copolymers (i.e., styrene-butadiene-styrene), and SIS block copolymers (i.e., styrene-isoprene-styrene). Other useful polymer resins include, for example, acrylates and alkylacrylates (e.g., ethylene ethyl acrylate (EEA) and ethylene methyl acrylate (EMA) copolymers), and natural or synthetic rubber-based resins (e.g., silicone, polyurethane, chloroprene, butyl, polybutadiene, isoprene, and neoprene).

The polymer resin component of the hot melt adhesive of the invention is typically present in an amount ranging from about 10% to about 60% weight, more typically from about 20% to about 40% weight, and most typically from about 25% to about 35% weight of the adhesive composition. Mixtures of two or more polymer resins may also be useful in some compositions.

Tackifying Resin

Hot melt adhesive compositions of the invention typically comprise a tackifying resin (also referred to as a "tackifier"). The tackifier influences wetting, adhesion, and tack in the hot melt adhesive. The glass transition temperature (Tg) of the tackifier and its compatibility with the polymer resin influence the degree of tackification achieved. The tackifier is typically present in amount ranging from about 10% to about 70% weight, more typically from about 20% to about 60% weight, and most typically from about 30% to about 40% weight of the adhesive composition. Mixtures of two or more tackifying resins may be useful in some compositions.

Useful tackifying resins may include any compatible resin or mixtures thereof such as natural and modified rosins including, for example, gum rosin, wood rosin, tall oil rosin, distilled rosin, hydrogenated rosin, dimerized rosin, resinates, and polymerized rosin; glycerol and pentaerythritol esters of natural and modified rosins, including, for example the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70 C to 150 C; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70 C to 135 C; aromatic petroleum hydrocarbon resins and the hydrogenated derivatives thereof; and alicyclic petroleum hydrocarbon resins and the hydrogenated derivatives thereof. Also included are the cyclic or acyclic C5 resins and aromatic modified acyclic or cyclic resins.

Examples of commercially available rosins and rosin derivatives include SYLVALITE RE 110, SYLVARES RE 115, and SYLVARES RE 104 (available from Arizona Chemical); Dertocal 140 from DRT; Limed Rosin No. 1, GB-120, and Pencel C from Arakawa Chemical.

Representative examples of synthetic hydrocarbon tackifiers include aliphatic olefin derived resins such as those available from Sartomer under the trade designation "WINGTACK" and from Exxon under the trade designation "ESCOREZ 1300". A common C5 tackifying resin in this class is a diene-olefin copolymer of piperylene and 2-methyl-2-butene having a softening point of about 95 C. This resin is available commercially under the trade designation "WINGTACK 95". Also useful are aromatic hydrocarbon resins that are C9 aromatic/aliphatic olefin-derived.

Wax

The hot melt adhesives of the invention may also comprise a synthetic wax or petroleum-derived wax, for example, paraffin wax, microcrystalline wax, polyethylene wax, Fischer-Tropsch wax, and the like. Selection of the particular wax and the amount of wax in the composition can be made by one of skill in the art with reference to the desired adhesive properties and adhesive application. In many embodiments, the hot melt adhesive comprise about 2:1 to about 3:1 weight ratio of synthetic or petroleum-derived wax to metathesized unsaturated polyol ester wax.

Other Ingredients

The hot melt adhesives of the invention may optionally comprise other ingredients including those that are conventionally used in hot melt adhesives. For example, additives such as stabilizers, plasticizers, fillers, pigments, and antioxidants may be included. In addition, small amounts of additional (secondary) tackifiers may also be incorporated in minor amounts into the adhesive compositions of the present invention.

Method of Making Hot Melt Adhesives

The hot melt adhesives of the invention are typically prepared by blending the components in the melt until a homogeneous blend is obtained. Various methods of blending are known to the art and any method that produces a homogeneous blend is satisfactory.

Uses

The hot melt adhesives of the invention may be used in general bonding applications including, for example, packaging, bottle labeling, and bookbinding applications. Packaging formulations may be used to manufacture corrugated cartons, boxes and the like. Other applications include nonwoven bonding (e.g., disposable diapers), product assembly, graphic arts, automotive, and tapes and labels. In many packaging adhesive formulations, the metathesized unsaturated polyol ester wax may partially or totally replace paraffin wax and may provide the formulation with one or more improved properties including increased open time and increased adhesion to coated carton stock. In many bottle labeling applications, the metathesized unsaturated polyol ester wax may partially or totally replace microcrystalline wax and may provide one or more improved properties.

In some embodiments, hot melt PSAs of the invention have low adhesion to polyester film such as Mylar-brand polyester film. Advantageously, this property allows untreated polyester film (i.e., polyester film without a surface release layer, such as a silicone release layer) to be used as a release liner against hot melt PSAs of the invention. More specifically, certain adhesive-coated articles such as label stock, which conventionally requires a silicone-coated release liner can now be manufactured using an untreated polyester liner. The use of an untreated polyester release liner reduces the cost of the product and additionally reduces the chance for contamination of the pressure-sensitive adhesive, for example, silicone contamination.

Hot melt adhesives may be applied using numerous methods depending upon the application requirements. Representative techniques include application by nozzle, slot dies, extrusion, wheel, screen printing, melt blowing, and spiral spray. In some embodiments, the hot melt adhesives are extruded in bead form onto a substrate using piston pump or gear pump extrusion equipment. Wheel applicators may also be used for applying hot melt adhesives. Alternatively, the adhesive may be applied by the packaging converter prior to shipment to the packager, i.e., the container comprises a preapplied adhesive. Following loading of the container, the container may be heat sealed by conventional means or subjected to any alternative source of energy that heats the hot melt adhesive to the desired bonding temperature.

The invention will now be described with reference to the following non-limiting examples.

EXAMPLES

Example 1

Metathesized unsaturated polyol ester wax was evaluated for use in certain hot melt adhesive applications. The applications were as follows.

1. As a Paraffin Wax Replacement in Packaging Adhesives.

High melt point (~210° F.) synthetic polyethylene waxes and Fischer-Tropsch waxes are the most commonly used waxes in hot melt packaging adhesives at levels of about 25% to 35%. These synthetic waxes are used to control the open and set time of the adhesive and contribute to the heat resistance of the adhesive bonds. They are relatively expensive and have been in short supply. As a result adhesive formulators commonly extend (i.e., dilute) the synthetic wax with a paraffin wax. Metathesized unsaturated polyol ester waxes may be used in packaging adhesives in order to replace at least a portion of the paraffin wax extender.

2. As a Paraffin Wax Replacement in Low Application Temperature (e.g. 250° F.) Packaging Adhesives.

Typically, low application temperature packaging adhesives include a low melt point (140° F. to 155° F.) paraffin wax as the crystalline component. High melt point synthetic waxes are not typically used because they cause the open time to be too short when the hot melt adhesive is applied at 250° F. Because these products do not contain any high melt point synthetic wax, their bonds typically have poor heat resistance and may fail at temperatures above about 120° F. Metathesized polyol ester waxes are inherently slow setting and are useful to extend the open time and set time and provide improved bond heat resistance.

3. As a Replacement for a Microcrystalline Wax in Bottle Labeling Adhesives.

Metathesized polyol ester waxes may be used to replace microcrystalline waxes in bottle labeling adhesives.

Packaging Adhesive Compositions:

TABLE 1 provides formulations for various packaging adhesive compositions of the present invention along with certain comparative examples. Comparative examples 4-88-1, 4-88-2, and 4-88-3 are typical packaging adhesive formulations having three different ratios of paraffin and synthetic wax. Examples 4-88-4, 4-88-5, and 4-88-6 are hot melt adhesive compositions of the invention where the paraffin wax has been replaced with a blend of 33% weight of a metathesized polyol ester wax and 66% weight of hydrogenated soybean oil (referred to herein as 64B wax). Comparative Examples 4-88-7, 4-88-8, and 4-88-9 replace the paraffin wax with a generic soybean oil wax.

The adhesive compositions were tested as follows.

Heat Resistance:

The heat resistance test characterizes the temperature at which one square inch Kraft paper bonds fail when subjected to a constant 100 g force in peel and 500 g force in shear. These are typically referred to as the "Peel Adhesion Failure Temperature" (PAFT), and "Shear Adhesion Failure Temperature" (SAFT).

As shown in TABLE 1, the SAFT values decrease as the amount of high melt point synthetic wax decreases, regardless of which low melt point wax is used. This is an expected trend and the overall differences in the effect of the three different extending waxes was not observed to be significant.

As shown in TABLE 1, the PAFT values were largely unaffected by the amount of paraffin wax or 64B wax in the formulation. The PAFT values for soybean wax were observed to decrease with the amount of soybean wax that was added. As a general trend, it was observed that there was a decrease in PAFT when either 64B wax or soybean wax was used to replace the paraffin wax. This may indicate a decrease in bond heat resistance.

Open Time:

Open time is a measure of the length of time an adhesive will be able to wet out and bond a second substrate after it has been applied to a first substrate. In other words, it measures the maximum amount of time that can elapse after applying the hot melt adhesive and before mating two substrates using the adhesive to form a bond.

Open time depends on the initial application temperature, the amount of adhesive applied, the bead geometry, and the ambient temperature. In the open time test used herein, a 20 mil film of adhesive that was 2 inches wide and about 10 inches long was applied at a temperature of 350° F. One-half inch strips of paper were then laminated to the molten adhesive at 5 second intervals until the adhesive cooled to a point where it would no longer bond to the paper. The open time is maximum time at which the adhesive bond is capable of tearing fibers from the paper upon removal of the paper from the bond.

The data shows that the open time of the paraffin wax adhesive does not change as the amount of paraffin wax in the formulation is varied. By contrast, the open time of the adhesives prepared with 64B wax or soybean wax was observed to increase as the amount of the 64B wax or soybean wax increased. This data also demonstrates that adhesives comprising 64B wax or soybean wax can have equivalent open time to adhesives comprising paraffin wax.

Waxy Stage and Set Temperature:

Hot melt adhesives were applied in a molten state and were cooled to ambient temperature to form a bond. As the adhesives cool they pass through various stages with different characteristics that are important to bond formation. One way to view these stages is to lay a strip of adhesive on an aluminum plate that is heated on one end and cooled at the other end (i.e., a gradient heat bar) so that a heat gradient from one end to the other is formed. For this test, a bead of adhesive at 350° F. was applied to the gradient heat bar and a strip of Kraft paper was immediately applied over the molten bead. Initially, the adhesive bead is molten and the adhesive wets out the entire length of the paper strip (~15 inches in length). The adhesive bead with paper attached is then allowed to reach equilibrium with the gradient heat bar. This causes the paper to be firmly bonded at the cold end of the bar and unbonded or lightly bonded at the hot end of the bar (i.e., where the adhesive is molten). The paper strip is then slowly peeled from the hot end to the cold end of the bar. Near the hot end, the molten adhesive adheres to both the paper and the heated bar with the adhesive stringing and legging between the two surfaces. This stage is called the "hot tack" stage and represents a temperature range where the molten adhesive is fully compatible, without any crystallite formation. Bonds that are disturbed while the adhesive is in the hot tack stage will reform. The longer the hot tack stage, the more forgiving the adhesive is, but there may also be a tendency for the product to string more during application. As the paper strip continues to be peeled, the adhesive cools and eventually enters the "waxy stage" where the adhesive is no longer fluid and most of the adhesive peels away from the paper leaving only a slight stain on the paper. The adhesive is less compatible at this temperature. If a bond is disturbed at this stage it will not reform. Adhesives with a long waxy stage are less robust but are observed to apply more cleanly than products with a lot of hot tack. As the paper strip continues to be peeled, the adhesive cools further and eventually the paper tears.

Figure 7:
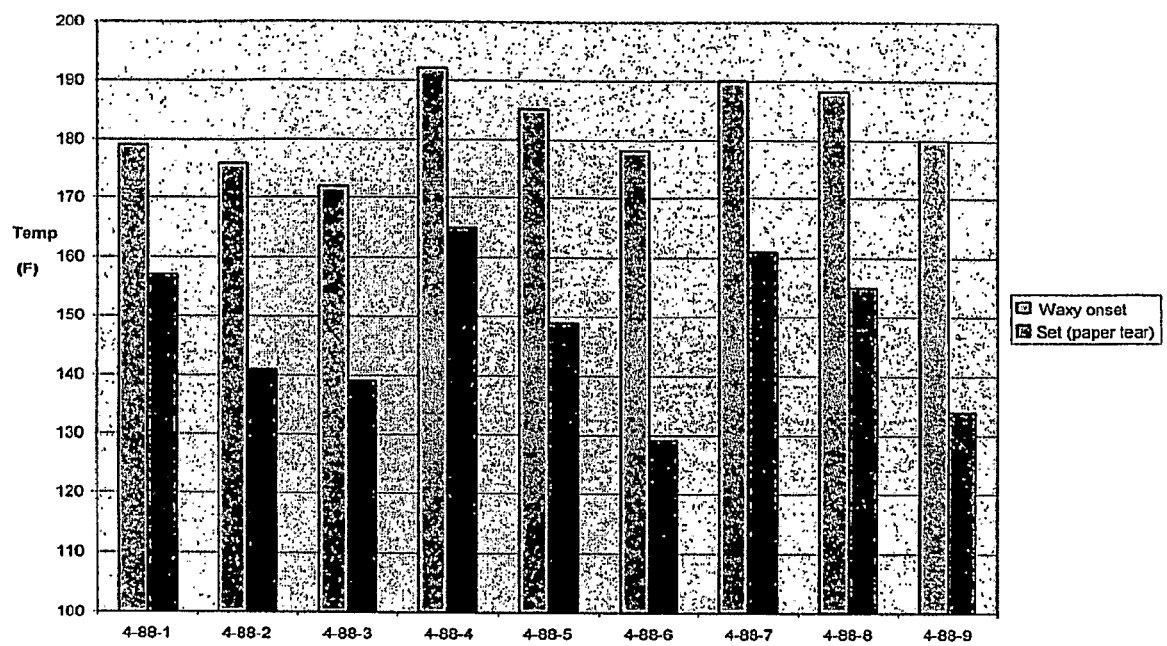
FIG. 7 is graph displaying waxy stage and set temperature data for certain adhesive compositions.
Figure 8:
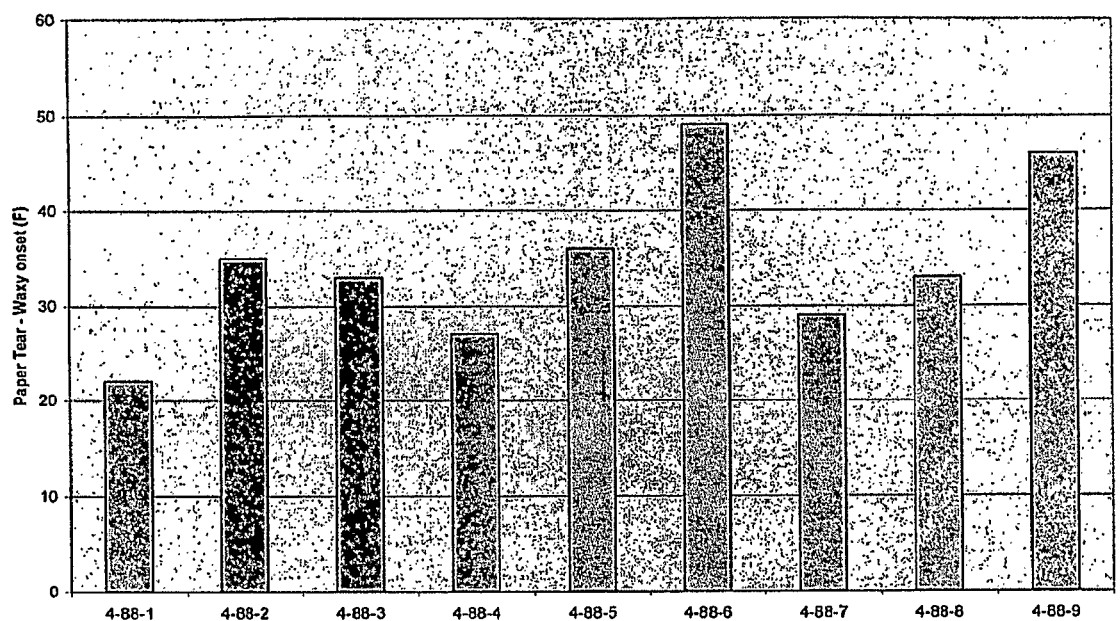
FIG. 8 is a graph displaying waxy stage data for certain adhesive compositions.

Using the above technique, the temperature at which the waxy stage started (also the temperature at which the hot tack stage ends) and the temperature at which the paper tore ("set temperature") were measured. The results of the gradient bar measurements are shown in FIGS. 7-8. The set temperatures in FIG. 7 indicate that the 64B wax and soy wax adhesives set up slower than the paraffin wax control adhesive when equivalent amounts are used. It was also observed that adhesives with a lower ratio of 64B wax and synthetic wax should have equivalent set times to paraffin based products.

The above was confirmed by comparing the rate of set of 4-88-3 to 4-88-4 using a "tackdown" test. In this test, 0.5 inch wide strips of adhesive film were placed side-by-side on a rigid sheet of paper. The adhesive films were heated until molten (about 1 minute at 350° F.) and were laminated to a second sheet of paper. The top paper was then slowly peeled back while the adhesive film cooled. As the adhesive cools, it goes through the hot tack stage, waxy stage, and eventual a paper tearing stage. The tackdown test is similar to the gradient heat bar test, but the temperature is allowed to cool to ambient naturally which is more in line with actual end use. It was found that the Comp. Ex. 4-88-3, which contained 20% weight paraffin wax was equivalent in rate of set to Example 4-88-4, which contains 10% weight 64B wax.

The difference between the waxy stage onset and the set temperature is characteristic of the length of the waxy stage. FIG. 8 shows that the waxy stage increases for all of the products as the high melt point synthetic wax is diluted, but more so for the 64B wax and soybean waxes. The increased waxy stage of 64B wax and soybean wax adhesives has the effect of making the bond formation less robust, but the products should machine more cleanly.

Adhesive Bonds

Adhesive bonds were made with a virgin high density corrugated stock from Inland Container Corp. This is a relatively difficult stock to bond to which is useful. to show differences between adhesives, particularly at low temperatures. The results in TABLE 1 show that none of the products tore fiber at either 35° F. or 140° F., which is not unexpected for this particular formulation. The use of 64B wax, instead of paraffin wax, did not significantly improve low temperature performance.

The bond results at 120° F. indicate that both 64B wax and soybean wax based adhesives have less heat resistance than the paraffin products. The 64B wax products were noticeably better than soybean wax products and were equivalent to paraffin wax adhesives at lower ratios.

Adhesive bonds were also made with Hormel Black Label Bacon carton stock. This is a lacquer coated carton stock that tends to show differences between various formulations of hot melt adhesives. The results indicated that the 64B wax-based adhesives have better adhesion to this carton stock at 35° F. than either paraffin or soybean based products.

Low Application Temperature Adhesive:

TABLE 2 provides formulations and test results for low application temperature adhesives identified as Comp. Example 4-90-1, Example 4-90-2, and Example 4-90-3. Comparative Example 4-90-1 is a control based upon 100% paraffin wax (Sasol R07152). In Examples 4-90-2 and 4-90-3, the paraffin wax was replaced by a blend of 64B wax and a high melt point synthetic wax (Sasol H-1) to determine whether open time and rate of set would be comparable.

Figure 9:
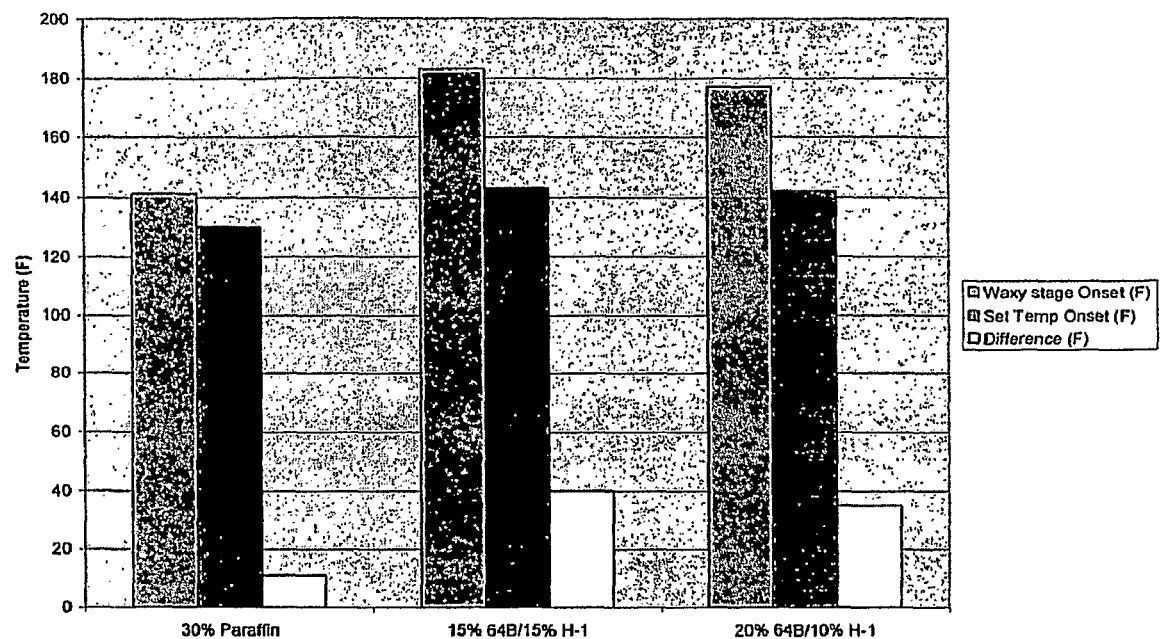
FIG. 9 is a graph displaying data for certain low application temperature adhesive compositions.

As shown in TABLE 2 and FIG. 9, the set temperature (from the gradient heat bar test) of the 64B wax-containing adhesives is similar to the control. The 4-90-3 adhesive has a similar rate of set to the control using the tackdown test. The most noticeable difference in setting characteristics was the increased waxy stage which makes the bond formation less robust.

Corrugated bonds were evaluated at 120° F. and 140° F., and the two 64B wax-based adhesives were found to be similar to the control based on paraffin wax.

Bottle Labeling Adhesive:

A bottle labeling adhesive using 64B wax as a replacement for microcrystalline wax was prepared. The formula is provided in TABLE 3 along with a comparative formulation. Laboratory testing of bottle labeling adhesives is subjective; however, the testing indicated that the 64B wax-based formulation (Example 14-30-2) performed acceptably as a bottle labeling adhesive.

TABLE 1

| Ingredient | Description of Ingredient | Comp Ex. 4-88-1 | Comp Ex. 4-88-2 | Comp Ex. 4-88-3 | Ex. 4-88-4 | Ex. 4-88-5 | Ex. 4-88-6 | Comp Ex. 4-88-7 | Comp Ex. 4-88-8 | Comp Ex. 4-88-9 |
|---|---|---|---|---|---|---|---|---|---|---|
| Sasol R-7152 | Paraffin wax | 10 | 15 | 20 | | | | | | |
| 64B | Metathesized Polyol Ester wax (33%) and hydrogenated soybean oil (67%) | | | | 10 | 15 | 20 | | | |
| Soy wax | Generic soy wax | | | | | | | 10 | 15 | 20 |
| Sasol H-I | Fischer-Tropsch wax | 20 | 15 | 10 | 20 | 15 | 10 | 10 | 10 | 10 |
| Sylvalite RE-100 | Rosin ester tackifier | 15 | 15 | 15 | 15 | 15 | 15 | 15 | 15 | 15 |
| Sylvares TP2040 | terpene-phenolic tackifier | 20 | 20 | 20 | 20 | 20 | 20 | 20 | 20 | 20 |
| Escorene 7510 | EVA (28% VA, 400 MI) | 35 | 35 | 35 | 35 | 35 | 35 | 35 | 35 | 35 |
| Heat Resistance | | | | | | | | | | |
| 100 g peel failure temp. PAFT (° F.) | | 130 | 132 | 132 | 112 | 113 | 108 | 108 | 96 | 93 |
| 500 g shear failure temp SAFT (° F.) | | 183 | 178 | 169 | 192 | 188 | 176 | 197 | 188 | 174 |
| Open Time (sec) | | 30 | 30 | 30 | 25 | 30 | 50 | 20 | 40 | 50 |
| Gradient Heat Plate | | | | | | | | | | |
| Waxy stage onset (° F.) | | 179 | 176 | 172 | 192 | 185 | 178 | 190 | 188 | 180 |
| Set Temp onset (° F.) | | 157 | 141 | 139 | 165 | 149 | 129 | 161 | 155 | 134 |
| Difference (° F.) | | 22 | 35 | 33 | 27 | 36 | 49 | 29 | 33 | 46 |
| Corrugated | | | | | | | | | | |

TABLE 1-continued

| Ingredient | Description of Ingredient | Comp Ex. 4-88-1 | Comp Ex. 4-88-2 | Comp Ex. 4-88-3 | Ex. 4-88-4 | Ex. 4-88-5 | Ex. 4-88-6 | Comp Ex. 4-88-7 | Comp Ex. 4-88-8 | Comp Ex. 4-88-9 |
|---|---|---|---|---|---|---|---|---|---|---|
| Inland Bonds | | | | | | | | | | |
| 35° F. | Percent fiber tear | 0 | 0 | 0 | 0 | 0 | 0 | 0 | 0 | 0 |
| 120° F. | | 100 | 100 | 100 | 100 | 100 | 50 | 50 | 0 | 0 |
| 140° F. | | 0 | 0 | 0 | 0 | 0 | 0 | 0 | 0 | 0 |
| Bacon Carton Bonds | | | | | | | | | | |
| 35° F. | Percent fiber tear | 25 | 25 | 25 | 50 | 50 | 25 | 25 | 25 | 25 |

TABLE 2

| Ingredient | Comp. Ex. 4-90-1 | Example 4-90-2 | Example 4-90-3 |
|---|---|---|---|
| Metathesized Wax Blend (64B) | 0 | 15 | 20 |
| Sasol R-7152 wax (Sasol) | 30 | 0 | 0 |
| Sasol H-1 wax (Sasol) | 0 | 15 | 10 |
| Sylvalite RE100 (rosin ester from Arizona Chemicals) | 28 | 28 | 28 |
| Sylvares TP2040 (terpene phenolic tackifying resin from Arizona Chemicals) | 10 | 10 | 10 |
| EVA (28VA-800MI) | 32 | 32 | 32 |
| Viscosity at 250° F. | | 1070 cps | |
| Heat Resistance | | | |
| 100 g peel failure temp. (° F.) | 118 | 105 | 105 |
| 500 g shear failure temp (° F.) | 149 | 185 | 170 |
| Gradient Heat Plate | | | |
| Waxy stage Onset (° F.) | 141 | 183 | 177 |
| Set Temp Onset (° F.) | 130 | 143 | 142 |
| Difference (° F.) | 11 | 40 | 35 |
| Inland Corrugated Bonds (%) Fiber Tear | | | |
| @ 120° F. | 100 | 100 | 100 |
| @ 140° F. | 0 | 0 | 0 |

TABLE 3

| Ingredient | Comp Ex. 14-30-1 | Example 14-30-2 | Description |
|---|---|---|---|
| Metathesized Wax Blend (64B) | | 7 | Blend of 33% hydrogenated metathesized soybean oil and 67% hydrogenated soybean oil (Cargill) |
| Microwax 180 F. | 10 | | soft, microcrystalline wax (Sasol) |
| AC-400 (EVA) | 10 | 10 | low viscosity, waxy, EVA polymer (Honeywell) |
| Sylvalite RE100 | 39.8 | 39.8 | rosin ester tackifier (Arizona Chemicals) |
| Kraton G-1652 | 12 | 12 | S(EB)S Block copolymer (Krayton Polymers) |
| Polybutene 300 | 14 | 15.5 | liquid polybutene |
| NH-120 | 14 | 15.5 | naphthenic oil |
| Irganox 1010 | 0.2 | 0.2 | Stabilizer (Ciba Specialty Chemicals) |
| Viscosity @ 250° F. | 2470 | 2750 | |
| Viscosity @ 300° F. | 740 | 870 | |
| Heat Resistance | | | |
| 100 g peel failure temp. (° F.) | 102 | 104 | |
| 500 g shear failure temp (° F.) | 136 | 121 | |

Some general observations on the 64B wax-based hot melt adhesives are as follows:

1. In some embodiments, hot melt adhesives based on 64B wax are slower setting than adhesives based on paraffin wax.

2. In some embodiments, blends of high melt point synthetic wax and 64B wax perform similar to synthetic wax/paraffin wax blends in rate of set and open time. However, these blends typically have a longer waxy stage which may make bond formation less robust.

3. In some embodiments, 64B wax displays equivalent heat resistance (as measured by corrugated fiber tear) to paraffin wax. Soybean wax has inferior heat resistance in blends with high melt point synthetic wax.

4. As compared to soybean wax, 64B wax has improved heat resistance and displays improved adhesion to coated carton stock.

6. 64B wax may be a suitable replacement for paraffin wax in low application temperature packaging products.

7. 64B wax may be a suitable replacement for soft microcrystalline waxes in hot melt bottle labeling adhesives.

Example 2

SAMPLE PREPARATION: Hot melt adhesive formulations were prepared in solvent and were hand-coated onto 2 mil Mylar-brand polyester (PET) film. It was observed that the adhesive containing metathesized soybean oil (Example 2-1) did not adhere to the Mylar PET film and had to be coated onto biaxially oriented polypropylene film (BOPP) in order to obtain peel and shear data. The dry adhesive coat weight for all samples was 25 grams/m².

TESTING PROCEDURES: Shear adhesion failure temperature (SAFT) was tested using ASTM-D-4498 with a 500 gram weight. 180 degree peel adhesion to stainless steel was tested using the Pressure Sensitive Tape Council PSTC-1 with a peel rate of 12"/minute. Brookfield Thermosel viscosity was tested at 300° F. and 350° F. using spindle SC4-27 and a DV-I+viscometer. The test data is set forth in TABLE 4.

TABLE 4

| Ingredient | Description | Example 2-1 | Comp. Ex. A | Comp. Ex. B |
|---|---|---|---|---|
| Metathesized Soybean Oil (% wt.) | Metathesized Unsaturated Polyol Ester Wax | 20 | | |
| Soybean Oil (% wt.) | Soybean Oil Wax | | 20 | |
| Calsol 5550 (% wt.) | Naphthalenic Oil | | | 20 |
| Vector 4230 (% wt.) | Styrene-Isoprene Block Copolymer | 30 | 30 | 30 |
| Escorez 1310 (% wt.) | Hydrocarbon Resin | 50 | 50 | 50 |
| Physical Property Testing | | | | |
| Brookfield Viscosity | | | | |
| @ 300° F. (cps) | | 12,170 | 6,340 | 26,200 |
| @ 350° F. (cps) | | 3,350 | 2,775 | 3,950 |
| Shear adhesion failure temp (SAFT) (° F.) | | 140 | 155 | 193 |
| 180 degree peel to stainless (lbs./inch) | | 1.6 | 1.2 | 2.2 |

Observations:
(1) It was observed that the hot melt pressure sensitive adhesives containing metathesized soybean oil did not stick to Mylar-brand PET film. This may allow adhesive coated articles that presently use silicone-coated release liners (e.g., silicone coated PET film) to be manufactured using an uncoated (i.e., non-silicone coated) Mylar release liner rather than a silicone coated release liner. This provides the potential for reducing the cost of the adhesive coated articles and providing a construction that is free of silicone transfer issues.
(2) The SAFT values for the adhesive containing the metathesized soybean oil was the lowest of the three adhesives. This may indicate that this wax is too compatible with the styrene-isoprene block copolymer.

Example 3

A removable PSA composition (Example 3-1) was prepared and tested as described below.
SAMPLE PREPARATION: The removable PSA formulation was prepared according to the formulation in TABLE 5. The adhesive was then dissolved in solvent at was hand-coated onto 2 mil BOPP film. The dry adhesive coat weight was 25 grams/m$^2$.
TESTING PROCEDURES: Shear adhesion failure temperature (SAFT) was tested using ASTM-D-4498 with a 500 gram weight. 180 degree peel adhesion to stainless steel was tested using the Pressure Sensitive Tape Council PSTC-1 with a peel rate of 12"/minute. The test results are provided in TABLE 5.

TABLE 5

| Ingredient | Example 3-1 |
|---|---|
| Metathesized Soybean Oil (parts) | 20 |
| Escorez 1310 (parts) | 47 |
| Vector 4230 (parts) | 33 |
| Endex 160 (parts) | 5 |
| Test Results | |
| Shear adhesion failure temp (SAFT) (° F.) | 175 |
| 180 degree peel to stainless (lbs./inch) | 0.5 |

All publications and patents mentioned herein are hereby incorporated by reference in their respective entireties. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A composition of matter comprising a hot melt adhesive comprising a metathesized unsaturated polyol ester wax.
2. The composition of claim 1, wherein the hot melt adhesive composition is a conventional hot melt adhesive.
3. The composition of claim 1, wherein the hot melt adhesive composition is a hot melt pressure-sensitive adhesive.
4. The composition of claim 1, wherein the hot melt adhesive composition is a low application temperature adhesive.
5. The composition of claim 1, wherein the hot melt adhesive is a bottle labeling adhesive.
6. The composition of claim 1, wherein the metathesized unsaturated polyol ester wax is partially hydrogenated.
7. The composition of claim 1, wherein the metathesized unsaturated polyol ester wax is fully hydrogenated.
8. The composition of claim 6, wherein the partially hydrogenated metathesized unsaturated polyol ester wax has an iodine value of about 120 or less.
9. The composition of claim 7, wherein the fully hydrogenated metathesized unsaturated polyol ester wax has an iodine value of about 10 or less.
10. The composition of claim 1, wherein the metathesized unsaturated polyol ester wax comprises a metathesized natural oil.
11. The composition of claim 10, wherein the metathesized natural oil comprises metathesized vegetable oil or metathesized animal fat.
12. The composition of claim 11, wherein the metathesized vegetable oil is selected from the group consisting of metathesized soybean oil, metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, or metathesized sunflower oil.
13. The composition of claim 1, wherein the metathesized unsaturated polyol ester wax comprises dimers, trimers, tetramers, and higher order oligomers.
14. The composition of claim 2, wherein the hot melt adhesive comprises:
    (a) a wax comprising a hydrogenated metathesized unsaturated polyol ester;
    (b) a tackifier;
    (c) a synthetic or petroleum-derived wax; and
    (d) an ethyl vinyl acetate polymer.
15. The composition of claim 14, wherein the synthetic or petroleum-derived wax comprises paraffin wax, microcrystalline wax, polyethylene wax, or Fischer-Tropsch wax.
16. The composition of claim 14, wherein the tackifier comprises one or more of a rosin ester tackifier or a terpene-phenolic tackifier.
17. The composition of claim 3, wherein the hot melt pressure-sensitive adhesive comprises:
    (a) a wax comprising a hydrogenated metathesized unsaturated polyol ester;
    (b) a tackifier; and
    (c) a polymer.

18. The composition of claim 17, wherein the polymer comprises a styrene-isoprene block copolymer.

19. An article comprising a substrate having a surface that is at least partially coated with a hot melt pressure-sensitive adhesive comprising a metathesized unsaturated polyol ester wax of claim 1.

20. The article of claim 19, wherein the article comprises:
   (a) a substrate at least partially coated with a layer of a pressure-sensitive adhesive comprising a metathesized unsaturated polyol ester wax; and
   (b) a release liner comprising uncoated polyester film, wherein an uncoated surface of the release liner is in direct contact with the layer of pressure-sensitive adhesive.

21. The article of claim 19, wherein the substrate comprises paper or cardboard.

22. The article of claim 19, wherein the article is a paper label.

23. The article of claim 19, wherein the pressure-sensitive adhesive is removable.

24. A composition of matter comprising a hot melt adhesive comprising a blend of (i) up to 33% by weight of a metathesized unsaturated polyol ester wax, wherein the metathesized unsaturated polyol ester wax comprises a metathesized natural oil comprising a metathesized vegetable oil or metathesized animal fat, wherein the metathesized vegetable oil is selected from the group consisting of metathesized soybean oil, metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, or metathesized sunflower oil, (ii) up to 66% by weight of a hydrogenated soybean oil, and (iii) between about 10% to about 20% by weight of a synthetic or petroleum derived wax.

* * * * *